United States Patent [19]
Shimano et al.

[11] Patent Number: 5,774,444
[45] Date of Patent: Jun. 30, 1998

[54] SPLIT PHOTO DETECTOR FOR DETECTING A CENTRAL PORTION AND A PERIPHERAL PORTION OF A REFLECTED LIGHT BEAM

[75] Inventors: Takeshi Shimano, Tokorozawa; Kimio Tatsuno, Tokyo; Kouichirou Wakabayashi; Takeshi Maeda, both of Kokubunji; Hisataka Sugiyama, Kodaira, all of Japan

[73] Assignee: Hitachi, Ltd., Tokyo, Japan

[21] Appl. No.: 533,991

[22] Filed: Sep. 27, 1995

Related U.S. Application Data

[63] Continuation-in-part of PCT/JP/00542 filed Mar. 24, 1995, and Ser. No. 321,619, Oct. 12, 1994, Pat. No. 5,703,846, which is a continuation-in-part of Ser. No. 285,003, Aug. 2, 1994, Pat. No. 5,491,678, which is a continuation of Ser. No. 704,227, May 22, 1991, abandoned.

[30] Foreign Application Priority Data

| May 25, 1990 | [JP] | Japan | 2-133823 |
| Oct. 13, 1993 | [JP] | Japan | 5-255354 |
| Mar. 25, 1994 | [JP] | Japan | 6-055419 |
| Jul. 1, 1994 | [JP] | Japan | 6-150795 |
| Sep. 29, 1994 | [JP] | Japan | 6-234781 |
| Oct. 17, 1994 | [JP] | Japan | 6-250838 |

[51] Int. Cl.⁶ ............................ G11B 7/12
[52] U.S. Cl. ............ 369/109; 369/112; 369/44.32; 369/44.41; 369/120
[58] Field of Search ............ 369/112, 118, 369/44.12, 116, 121, 275.3, 44.41, 44.32, 120, 109

[56] References Cited

U.S. PATENT DOCUMENTS

| 5,121,378 | 6/1992 | Hirose et al. | 369/112 |
| 5,283,778 | 2/1994 | Maeda | 369/121 |
| 5,347,509 | 9/1994 | Goldberg et al. | 369/275.3 |
| 5,396,478 | 3/1995 | Krantz | 369/112 |
| 5,434,840 | 7/1995 | Ezuka et al. | 369/116 |
| 5,491,678 | 2/1996 | Maeda et al. | 369/121 |
| 5,548,576 | 8/1996 | Matsumoto et al. | 369/112 |

FOREIGN PATENT DOCUMENTS

| 62-57134 | 3/1987 | Japan . |
| 2-282933 | 11/1990 | Japan . |
| 5-234121 | 9/1993 | Japan . |

Primary Examiner—Georgia Y. Epps
Assistant Examiner—Kim-Kwok Chu
Attorney, Agent, or Firm—Fay, Sharpe, Beall, Fagan, Minnich & McKee

[57] ABSTRACT

An optical information reproducing method, for optically reproducing information recorded on a recording medium, irradiates the recording medium with a laser beam and detects the light returning from the recording medium. When the diffracted light returning from the recording medium is detected, the optical intensity distribution of the diffracted light is detected by a plurality of detectors to produce a plurality of signals, and the signals are calculated to produce a reproduced signal for detecting the information.

18 Claims, 19 Drawing Sheets

SPLIT PHOTO DETECTOR FOR DETECTING A CENTRAL PORTION AND A PERIPHERAL PORTION OF A REFLECTED LIGHT BEAM

This is a continuation-in-part application of PCT JP application Ser. No. PCT JP 95/00542, the disclosure of which is hereby incorporated by reference, which is a continuation-in-part of U.S. patent application Ser. No. 08/321,619, now U.S. Pat. No. 5,703,846 filed Oct. 12, 1994, and U.S. patent application Ser. No. 08/285,003, filed Aug. 2, 1994, now U.S. Pat. No. 5,491,678, issued Feb. 13, 1996, which is a continuation application of U.S. patent application Ser. No. 07/704,227, filed May 22, 1991 now abandoned.

BACKGROUND OF THE INVENTION

The present invention relates to an optical disk apparatus for reproducing information optically from an optical recording medium and, more particularly, to a technique for improving the resolution characteristics of an optical system.

There is known an optical disk for recording information as a string of recording marks such as phase pits or recording magnetic domains. The recording marks are arranged on the recording track, which is helically or concentrically formed on the optical disk, and the detection of the recording marks is carried out by scanning them with a light spot along the recording track and by detecting the reflected light or the transmitted light by a photodetector.

The interval between the adjoining tracks is substantially equal to the size of the light spot so as to avoid crosstalk between the tracks, and the interval between the adjoining recording marks is also substantially equal to the size of the reproduced light spot so as to avoid interference between the recording marks on the same track.

The prior art is disclosed in Japanese Patent Laid-Open No. 57134/1987, 282933/1990 or 234121/1993, for example. According to this disclosure, it is proposed to provide a dead zone in the photodetector or to insert a filter for attenuating the central portion of a detecting beam into the optical system, so as to improve the resolution in the reproduction of the optical disk.

The resolution of the optical system is determined by how much diffracted light spread due to the structure of the pits or domains on the optical disk is directed to the optical system. In these examples of the prior art, therefore, the resolution is effectively improved by increasing the weight given to the peripheral portion including more diffracted light components.

As another method for improving the resolution, there is in the prior art a technique (i.e., the super-resolution effect) for reducing the main lobe of the condensed spot by interrupting the central portion of the beam for illuminating the optical disk or by inserting a phase filter for shifting the phase of the central portion by 180 degrees from that of the peripheral portion.

In the prior art described above, the light of the central portion of the detecting beam necessarily has to be unused thereby, resulting in a decrease of the quantity of light. In the magnetooptical disk in which the signal is read out from a slight polarization rotation, for example, the loss of the quantity of light leads to lowering of the signal-to-noise ratio (S/N ratio). This is because the noise includes components such as amplifier noise, which do not depend upon the quantity of light, so that the noise components relatively increase.

When the super-resolution effect is used, the width of the main peak decreases, but the side peaks rise to cause crosstalk from the information of the adjoining tracks or the interference between the codes. In order to eliminate these phenomena, there has been proposed a method for eliminating the side peaks by focusing the beam again on the detecting system and by allowing the focused light to pass through a pin hole. However, another problem, of the difficulty of adjusting the pin hole location, arises.

In order to solve such problems, an object of the present invention is to improve the resolution without any loss of the quantity of light.

Another object is to reduce the influence of the side peaks of a super-resolution spot.

In order to solve the problems, there is provided an optical disk apparatus which comprises: a semiconductor laser; an optical system for focusing the light from the semiconductor laser upon a recording medium; a photodetector for detecting the reflected light from the recording medium; and means for reproducing the signal recorded on the optical recording medium, from the electric signal from the photodetector. Further, the apparatus comprises means for separately detecting the optical intensities of the central portion and the peripheral portion of the light impinging upon the detector. These output signals are individually multiplied by constants and added to generate reproduced signals having different polarities.

Moreover, the central portion and the peripheral portion are separately detected on the photodetector.

Alternatively, the beam is divided into the center portion and the peripheral portion before the detection.

In the case of a magnetooptical disk, the magnetooptical signals are detected by using those means individually for the two split beams which are branched by a polarizing prism so as to accomplish the differential detections.

Moreover, the effect of phase super-resolution or amplitude super-resolution can be achieved by inserting a phase filter or a shielding sheet into the beam falling upon the optical recording medium.

According to another structure of the present invention, there is also provided an optical disk apparatus which comprises: a semiconductor laser; an optical system for focusing the light from the semiconductor laser upon a recording medium; a photodetector for detecting the reflected light from the recording medium; means for reproducing the signal recorded on the optical recording medium, from the electric signal of the photodetector; and a phase filter or a shielding sheet for partially acting upon the beam impinging upon the optical recording medium, wherein the light intensity of only the sectionally peripheral portion of the reflected light is detected to reproduce the signal.

The improvement in the output characteristics is prominent when the phase filter or shielding sheet acts upon the portion of the light falling on the detector, which has a standardization radius of 0.4 or less. Moreover, the quantity of light is less lost to give a higher effect when the phase filter is used. In order to detect the light intensity of only the sectionally peripheral portion of the reflected light, a split detector is used, for example, to reduce the gain of the output of the detected signal of the central portion to zero. This is effected by making the central portion of the detector a dead zone or a shielding area. Alternatively, there is provided a shielding sheet for interrupting the central portion of the beam returning from the optical recording medium.

The semiconductor laser beam is focused on the recording medium, and the circular central portion and the peripheral portion of the reflected light are separately detected. The detected signals are given gains of different polarities before they are added. As a result, the light of the central portion and the light of a part of the adjoining peripheral portion effectively offset each other so that the output obtained can approximate the output which is obtained from the light of only the outer peripheral portion. As a result, the ratio of light of the quantity of the central portion can be effectively lowered by the polarity inversion of a smaller area than that obtained merely by interrupting the central portion. Thus, it is possible to reduce the noise components that are in phase such as the laser noise irrespective of the location of the pupil plane, without wasting the light energy.

The separate detection of the central portion and the peripheral portion of the beam can be carried out by using a split photodetector. Alternatively, the beam can also be optically divided. For example, a locally reflective film is formed on the beam splitter for splitting the beam, to make the light quantity splitting ratios different between the central portion and the peripheral portion of the beam.

In the magnetooptical disk apparatus, the polarized beams may be individually detected and the signal is processed in the arrangement.

If the arrangement is used for the super-resolution spot formed by the phase filter or the amplitude filter, it is possible to effectively reduce the side lobe which has been a problem of the super-resolution. This is because the side lobe is widely spread over the disk to include large amounts of components having low spatial frequencies, so that the components slightly shift to the central portion on the pupil plane of the objective lens.

The light spot diameter cannot be smaller than $\lambda/NA$, where $\lambda$ is the wavelength of the reproduction light, and NA is the numerical aperture of the converging lens. In the recording/reproducing method of the prior art, moreover, a plurality of recording marks, if present in the reproduction light spot, cannot be separately detected, so that the optical disk has a limited recording density. Still worse, there is no effective compensation method for the signal deterioration caused by the change in the recording mark shape on the disk, the inclination of the disk, or the aberration of the illuminating optical system.

The present invention has an object to provide a method capable of recording/reproducing information at a high recording density exceeding the limit due to the light spot diameter, and a recording/reproducing method capable of optical reading even though the optical system deteriorates due to aberrations or the like.

According to the present invention, the information is reproduced by arranging a plurality of detectors on the light receiving face of an optical system for detecting the reproduction light from a recording medium and by calculating the signals from the individual detectors. Specifically, to the contrary of the prior art in which the light beam transmitted through the objective lens is integrated and detected, the light beam is not integrated but detected as a diffraction pattern, and the string of the recording marks contained in the light spot is determined from the shape of the diffraction pattern by the calculation.

The calculation coefficients to be used in the calculation can be calculated by reproducing the known recording mark string which is recorded in advance in the learning area of the recording medium. This learning area is preferably formed in the head of each sector.

Since the distribution of the intensity of light having passed through the objective lens is determined from the spatial distribution of the scanning light spot and the recording marks and from the function of the mark string, the recording marks contained in the light spot can be separately detected by detecting the diffraction pattern with a plurality of detectors.

The optical intensity distributions on the split detectors of the photodetectors are a superposition of a plurality of two-dimensional diffracted light intensity distributions. By calculating the outputs of the individual split detectors, however, the individual two-dimensional diffraction intensity distribution can be determined, so that the small mark string can be detected by calculating the individual diffraction intensities by using the determined two-dimensional diffraction intensity distribution and the weights determined from the light spot and the recording marks.

Accurate detection can be achieved even though aberrations are present in the optical system by forming learning areas on the recording medium to determine the calculation coefficients by the learning.

DESCRIPTION OF THE PREFERRED EMBODIMENTS

Figure 1:
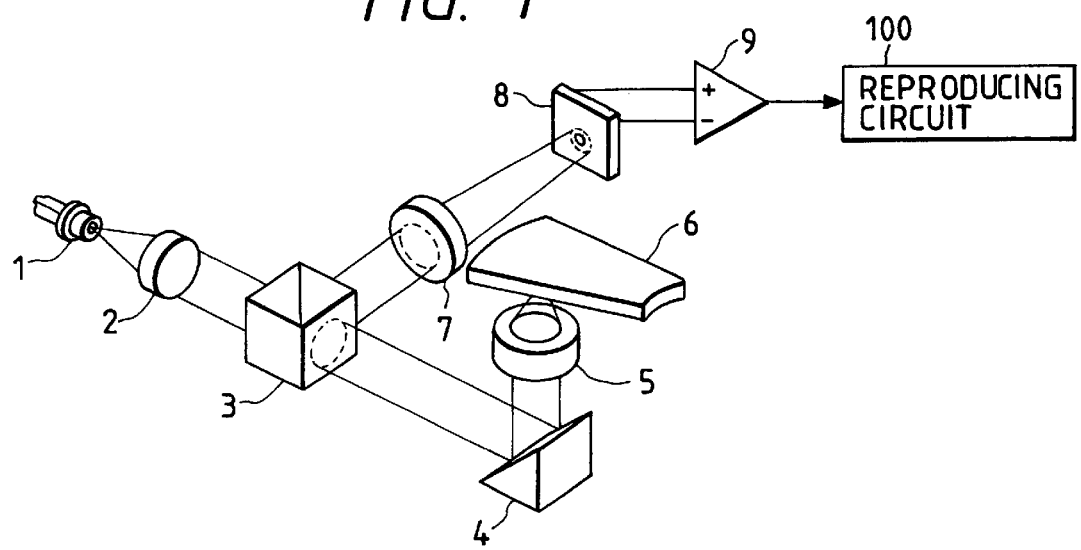
FIG. 1 is a perspective view of one embodiment of the present invention.

A basic embodiment of the present invention is shown in FIG. 1. The light from a semiconductor laser 1 is collimated by a collimator lens 2 into a parallel beam, which is passed through a beam splitter 3 and reflected by a riser prism 4. The reflected light is passed through an objective lens 5 and focused onto an optical disk 6. The reflected light is passed again through those elements and is reflected by the beam splitter 3 until it is focused by a condenser lens 7 onto a circular split photodetector 8. A reproduced signal is produced by amplifying the output of the central portion and the output of the peripheral portion of the reflected light beam differentially by a differential amplifier 9. The condensation by the lenses is performed for reducing the size of the detector 8 and for increasing the response speed. In the present invention, the location of the detector 8 has to be slightly shifted from the focal point. Because of the arrangement described above, the light of the central portion and a part of the light of the peripheral portion of the reflected light beam effectively offset each other so that the output is obtained as if only the light of the surrounding peripheral portion were detected. In the present embodiment, the absolute values of the gains for the outside part and inside part of the differential amplifier 9 are equal to each other. The combination of the ratio between the magnitude of the circular area and the absolute value of the gains can be freely determined so that the combination can be optimized by changing the design conditions.

Figure 2:
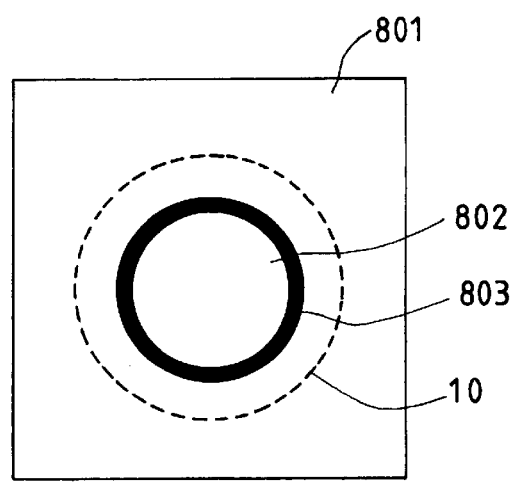
FIG. 2 is an enlarged plan view showing a photodetector.

FIG. 2 is an enlarged view of the photodetector 8 of FIG. 1. Across a ring-shaped split line area 803, the outputs of the central portion 802 and the peripheral portion 801 are separately outputted. A light spot 10 for illumination is desirably larger than the split line 803. Here, the detector is circular to improve the resolution in both the linear velocity direction and the radial direction of the optical disk but may be a rectangular trisected photodetector when the resolution in the system design is required to be in only one direction. In this case, too, a differential output may be taken between the outer two detectors and one center detector.

Figure 3:
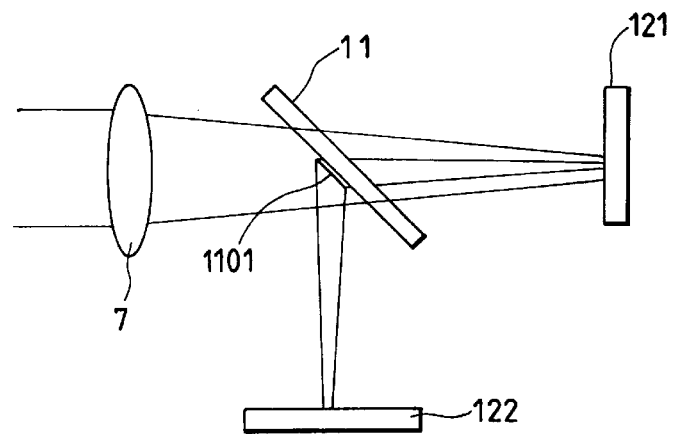
FIG. 3 is an enlarged side view showing a part of the optical system of the present invention.

FIG. 3 shows an embodiment in which the optical beam is optically divided into a central portion and a peripheral portion. In the optical path of the detecting beam before the condenser lens 7, there is arranged a beam splitter 11. This beam splitter 11 has a reflective film 1101 only on its central portion and may have an antireflection coating on the peripheral portion. Then, detectors 121 and 122 can be ordinary photodetectors, not split detectors. After this, effects similar to those of the embodiment of FIG. 1 can be achieved by differentiating the outputs of the detectors 121 and 122.

Figure 4:
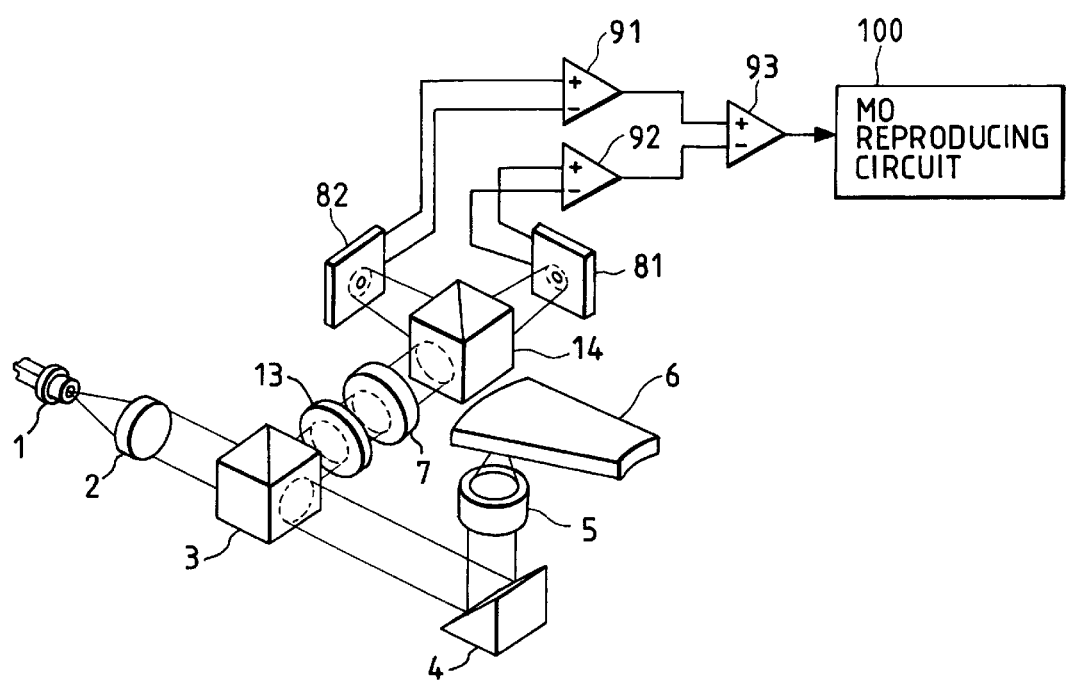
FIG. 4 is a perspective view showing one embodiment of the present invention.

FIG. 4 shows the structure of the apparatus for reproducing information on the magnetooptical disk. The basic structure is similar to that of FIG. 1, and the reflected beam is polarized at first by 45 degrees by a $\lambda/2$ plate 13 and is condensed by the condenser lens 7. The condensed light falls upon a polarizing beam splitter 14, and the P-polarized component passing therethrough and the S-polarized component reflected thereby are detected by circular split photodetectors 81 and 82, respectively. The differences between the signals of the inner portion and the outer portion of the individual detectors are produced by differential amplifiers 91 and 92. After this, the difference between the P-polarized light and the S-polarized light is taken by a differential amplifier 93 to produce a magnetooptical signal.

Figure 5:
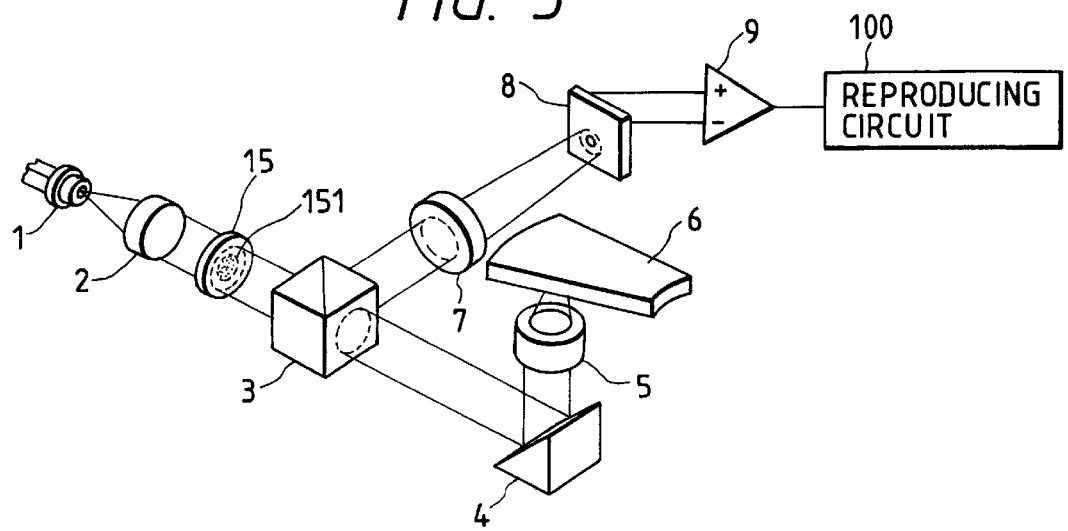
FIG. 5 is a perspective view showing an embodiment in which a super-resolution filter is used together.

FIG. 5 shows an embodiment in which a phase filter 15 is inserted to further reduce the size of a light spot incident upon the optical disk by the super-resolution effect. The basic structure is similar to that of FIG. 1, but a thin film 151 for inverting the optical phase by 180 degrees is added to the central portion of the phase filter 15. The beam can be detected by the circular split photodetector 8 to produce the differential output, reducing the influence of the side lobe.

This side lobe reducing effect can also be produced even when blocking a part of the detecting beam. This will be later described with reference to FIGS. 9 and 10.

Figure 6:
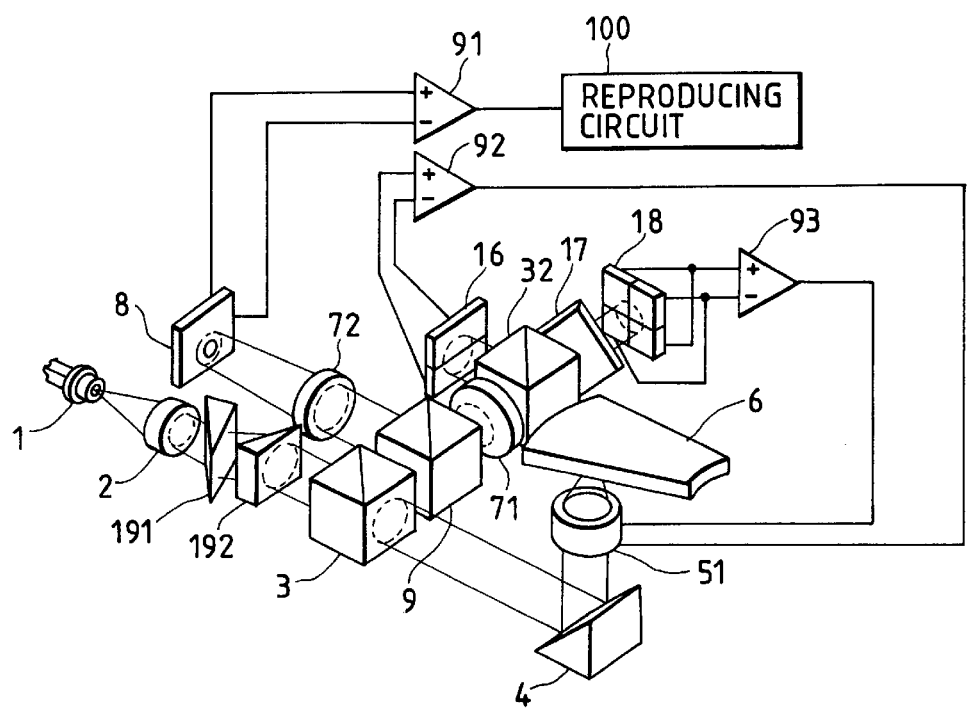
FIG. 6 is a perspective view showing an embodiment of an optical disk apparatus.

FIG. 6 shows an embodiment of a more detailed optical system arrangement. The light of the semiconductor laser 1 is collimated by the collimator lens 2 into a parallel beam, and an elliptical beam is shaped into a circular beam by beam shaping prisms 191 and 192. These prisms may be dispensed with if the light emission intensity of the semiconductor laser is sufficiently high. The light is then passed through the beam splitter 3 and is reflected by the riser prism 4. The reflected light passes through an actuator-integrated objective lens 51 and is focused onto the optical disk 6. The reflected light is passed again through these elements, reflected by the beam splitter 3, and split into transmitted light and reflected light. The reflected light is focused onto the circular split photodetector 8 by a condenser lens 72, and a reproduced signal is obtained by taking the difference between the inner side intensity and the outer side intensity of the differential amplifier 91.

On the other hand, the light having passed through the beam splitter 9 further passes through a condenser lens 71 and is split by a beam splitter 32 into transmitted light and reflected light. Here, the reflected light is separately detected by a bisected photodetector 16, and a tracking error signal is detected by taking the difference signal of the split outputs by the differential amplifier 92. The transmitted light passes through a cylindrical lens 17 and is detected by a quadrisected photodetector 18. The difference signal of the diagonal components is outputted by the differential amplifier 93 and is used as a focus shift signal. The tracking error signal and the focus shift signal are fed back by the objective lens actuator 51 to control the light spot on the optical disk 6. The arrangement thus far described is only one example but is not necessarily fixed. Another arrangement may be basically used for achieving equivalent signals. Likewise, there can also be used another optical system for reproducing the magnetooptical signal.

Figure 7:
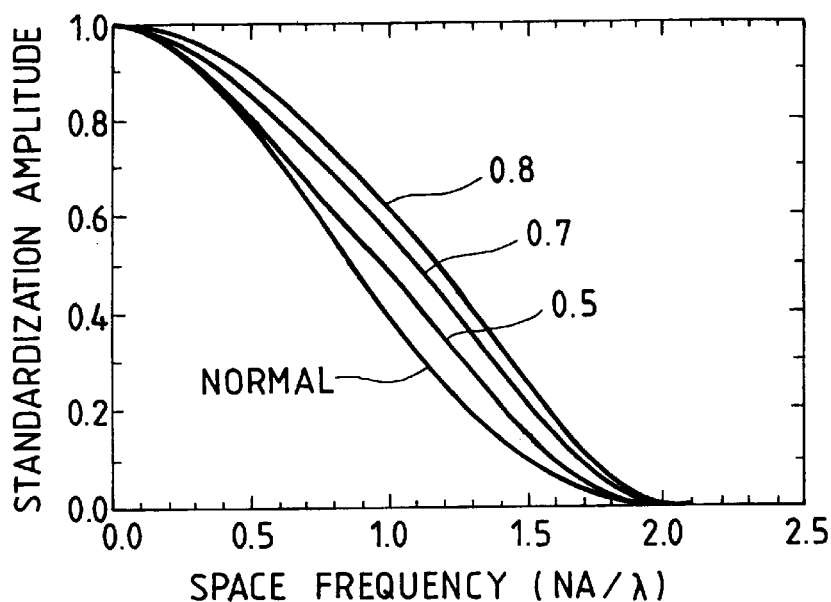
FIG. 7 is a graph of the MTF by peripheral light reception.
Figure 8:
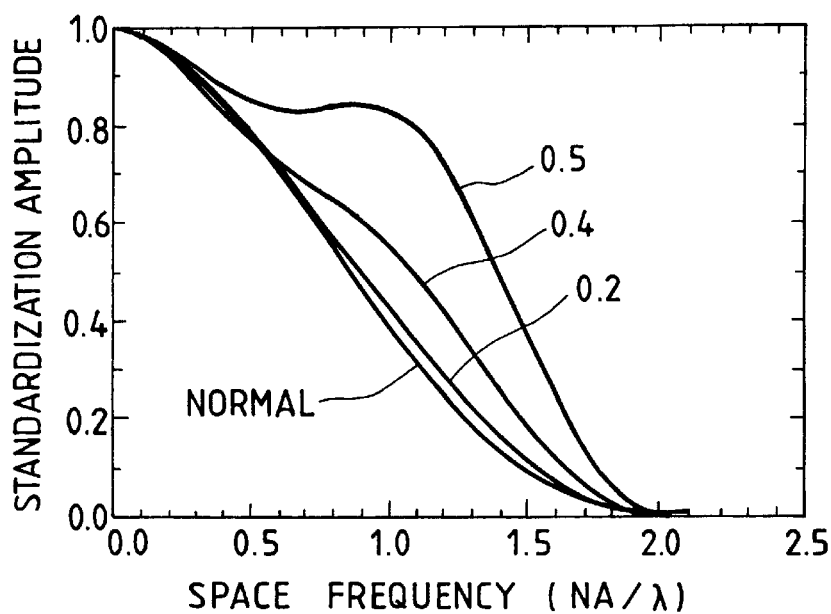
FIG. 8 is a graph of the MTF by differential output.

FIGS. 7 and 8 are the results of calculation with an MTF (Modulation Transfer Function) when the difference between the inner side and the outer side is taken and when only the peripheral portion of the beam is merely received. The horizontal axis is marked with the space frequency of the structure on the optical disk, and the vertical axis is marked with the amplitude of the space frequency component normalized with a DC component. The space frequency is normalized with NA/λ of the resolving power determined by the optical system. Here, NA is the numerical aperture of the optical system, and λ is the wavelength of the light. Moreover, the resolution limit of the optical system is 2NA/λ.

Here will be briefly described the method of calculating the MTF and the conditions for the calculations. The MTF is calculated by assuming a magnetooptical domain having a width of 0.4 µm and a length of 3 µm, by making the response of one domain edge a step response, when the magnetic domain is scanned with a light spot formed by collimating the light from a light source having a full width at half maximum of emission angle of 23° and a wavelength λ of 0.68 µm and by focusing the light beam with an optical system having a numeral aperture NA of 0.55, by spline-interpolating and then differentiating the waveform, by making the result of the differentiation an impulse response, and by subjecting the impulse response to a one-dimensional Fourier transformation.

In FIG. 7, the standardized light-shielding radius means the radius of a circular light-shielding area of the central portion when the radius of the detected beam is 1. The graph shows the results of MTF calculation when the beam is "Normal" (no light-shielding) and when the standardized light-shielding radii is 0.5, 0.7 and 0.8. It will be seen from the graph that the resolution is improved by the light-shielding and more improved by a larger light-shielding radius.

FIG. 8 shows the results of MTF calculation when the differential output is produced by the present invention. The standardized split radius is shown when the radius of the circular split line of the circular split photodetector and the radius of the incident beam is 1. It will be understood that the differential output of FIG. 8 is more effective in the improvement of the resolution than that of FIG. 7. The improvement of the standardization amplitude is prominent when the standardized split radius is larger than 0.4 and the graph show the effect in the area where the space frequency is higher than 0.5. Especially for the standardized split radius of 0.5, the standardization amplitude is doubled for the space frequency of 1.0 compared to when the beam is simply interrupted, as shown in FIG. 7.

Figure 9:
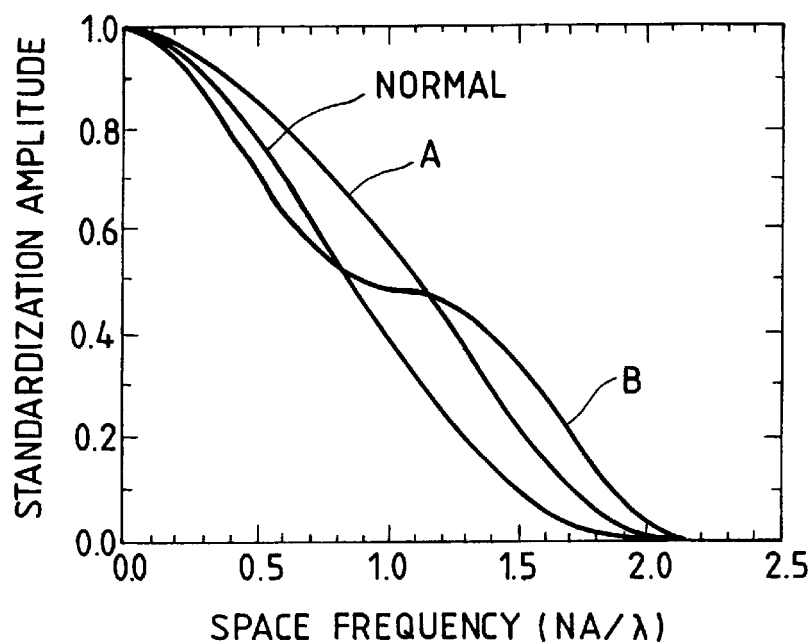
FIG. 9 is a graph of the MTF by an amplitude super-resolution and the peripheral light reception.

FIG. 9 shows, for comparison, the results of the MTF calculation of the peripheral light reception when the gains for the amplitude super-resolution and the central portion are zero (or when the central portion is shielded with a light-shielding sheet) and when the optical system is an ordinary one. For both of these cases, the standardized shielding diameter is 0.7. The light reception of the peripheral portion, indicated by A, shows excellent response characteristics all over the area, although it is inferior to the amplitude super-resolution, indicated by B, in the high frequency region. In this case, moreover, there is no difference between the super-resolution alone and the combination of the peripheral light reception and the super-resolution. When the super-resolution effect of the light-shielding type is used, little light returns to the center, so that the effect of the peripheral light reception is not achieved when both the standardized shielding radii are 0.7.

Figure 10:
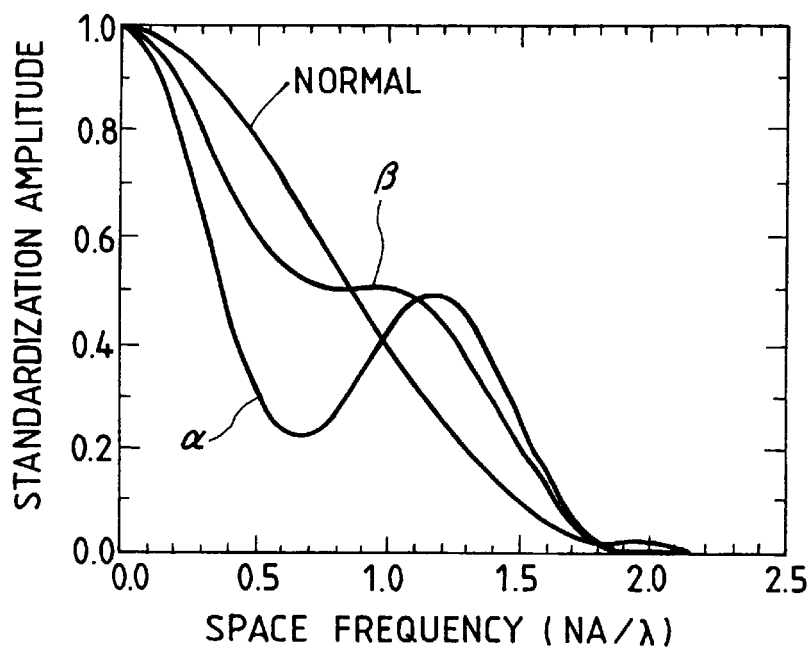
FIG. 10 is a graph of the MTF in which a phase super-resolution and the peripheral light reception are used together.

FIG. 10 shows, for comparison, the results of MTF calculation in the case (α) in which the super-resolution effect is used when the phase of 40% of the central portion of the optical beam is shifted by 180 degrees, and in the case (β) in which the peripheral light reception of the standardized shielding radius of 0.4 and the super-resolution effect of the case (α) are used together. In both the cases (α) and (β), an ordinary (Normal) optical system is used. FIG. 10 teaches that the deterioration of the low frequency region due to the use of only the super-resolution is considerably prevented by the combined use of the peripheral light reception. At this time, the change in the high frequency region is little.

Figure 11:
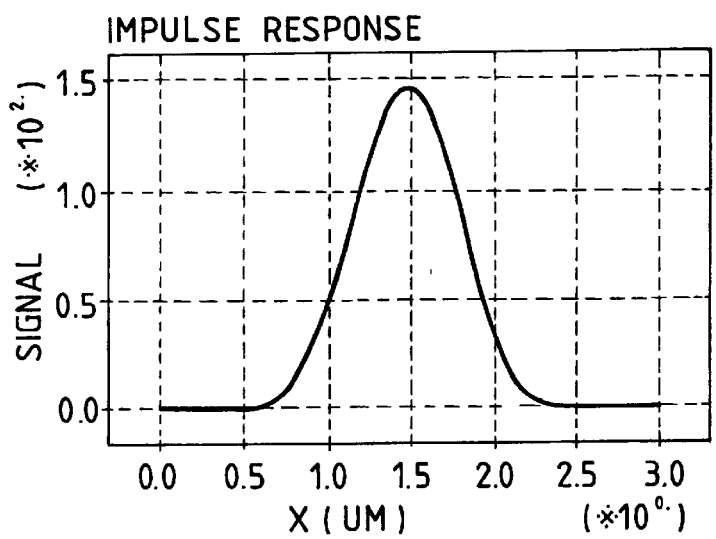
FIG. 11 is a graph of impulse response of the prior art.
Figure 12:
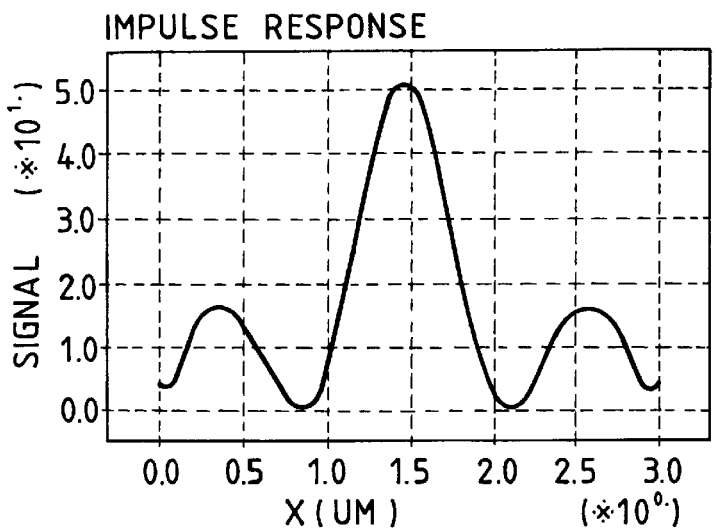
FIG. 12 is a graph of impulse response by the phase super-resolution.
Figure 13:
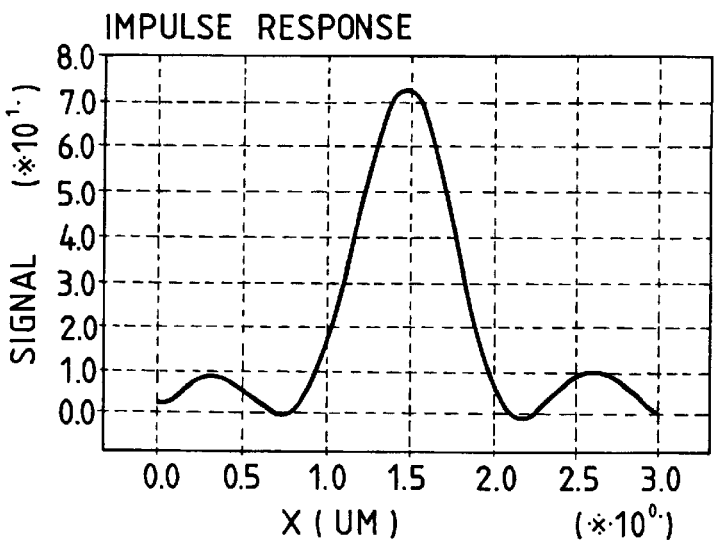
FIG. 13 is a graph of impulse response of when the peripheral light reception is used together with the phase super-resolution.

FIGS. 11, 12 and 13 shows the impulse responses which are obtained in the course of determining FIG. 10. Here, the differentiated values of the original step response waveform, as they are, are plotted vertically. FIG. 11 shows the normal case; FIG. 12 shows the super-resolution case; and FIG. 13 shows the case in which the peripheral light reception is combined in use. From these graphs, it will been seen that the heights of the side peaks are considerably suppressed while the main peak at the center is hardly changed.

As has been described hereinbefore, according to the present invention, it is possible to improve the resolving power of the optical system without any optical loss thereby to highly precisely reproduce the information on the optical disk which is highly densely recorded, with little crosstalk between the adjacent tracks.

Here will be described an embodiment for the highly dense recording and reproducing of the recording marks by arranging them closer together than a spot size, not only in the track direction but also in a track radius direction.

A method of recording smaller marks than the light spot size will be described with reference to FIG. 15. These details are disclosed in Japanese Patent Application No. 65547/1995 (or PCT patent application No. PCTJP95/00542).

Figure 15A:
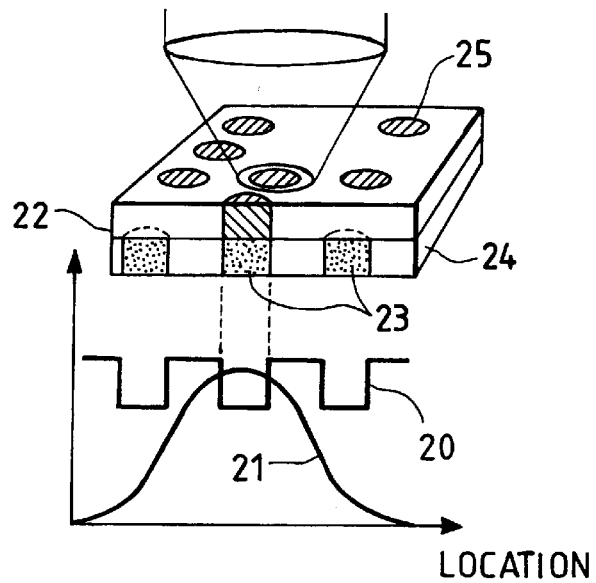
FIGS. 15a to 15c are explanatory diagrams of a magnetooptical recording medium capable of recording small marks.

The magnetooptical recording medium to be used is exemplified by a medium of which the recording temperature characteristics are locally lowered on the disk surface, as shown by the solid line 20 in FIG. 15a. The central portion of the light spot is located in the portion where the recording temperature is lowered, to make a temperature distribution, shown by the solid line 21. Then, the portion to be heated to a recording temperature 20 is restricted to the peak portion of the temperature distribution 21, and therefore it is smaller than the light spot diameter. In the recording using the peak portion of the temperature distribution of the prior art, the size of the recording marks so seriously changes due to the variation of the temperature distribution that the recording marks cannot be stably formed. If this recording medium is used, the gradient of the recording temperature with respect to the position is polarized oppositely to the gradient of the temperature distribution with respect to the position so that the variation of the intersection of the two can be suppressed against the variation of the temperature distribution. As a result, small recording marks can be stably formed with a lower recording energy than that of the prior art.

There are two methods for changing the recording temperature. One is a method for changing the recording magnetic field locally: the other is a method for changing the coercive characteristics of the medium locally. FIG. 15a shows one example in which the magnetic field is locally changed. A buried layer 24 having fine magnetizations 23 buried therein in advance is formed in contact with a recording film 22. The fine magnetization marks 23 are two-dimensionally arranged and the external magnetic field over the recording layer 22 in contact with the buried layer 24 is increased by the intensity of the magnetic field generated by the magnetization marks 23, to change the effective external magnetic field. An effectively intense external magnetic field is applied to the portion of the recording layer 22 located over the buried magnetic domains 23, lowering the recording temperature below that of the recording layer around the former. As a result, when the recording medium is irradiated with the recording light, recording marks 25 that are smaller than the recording spots are formed in the area over the buried domains 23 at a lowered recording temperature.

Figure 15B:
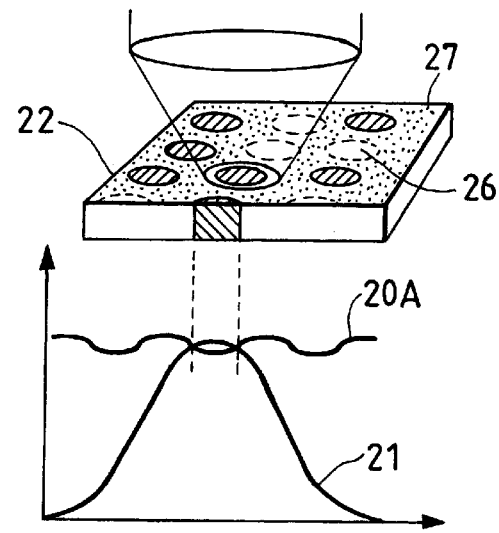
Figure 15C:
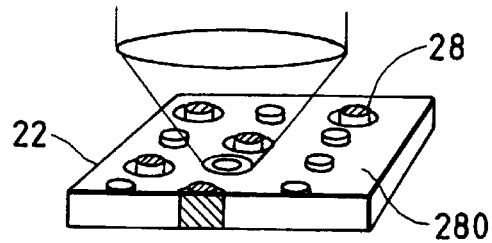

FIGS. 15b and 15c are explanatory diagrams of examples in which the coercive characteristics of the recording medium are locally changed. FIG. 15b shows an example in which the surface of the area 27, other than the area 26 where the recording marks are to be formed, is roughened to enhance the coercive force. With the rough surface, the surface energy for stopping the magnetic domain wall is increased to increase the apparent coercive force. In FIG. 15b, therefore, the recording temperature is relatively lowered in the recording mark area 26. According to the surface roughening method, the surface excepting the two-dimensional lattice points is roughed by applying resist which is cross-linked when irradiated with light and does not dissolve in developer, irradiating the small mark portions on the two-dimensional lattice points with light, and etching them with a dense developer. The surface around the small marks can be roughed by preparing a stamper from an original thus fabricated and by stamping a plastic sheet with its rough surface.

FIG. 15c shows an example in which the recording marks are located on small rough marks 28. These rough marks 28 may be formed by the aforementioned lithography and by an ordinary stamping process. The portion 280 other than the rough portions has a smooth surface of a low surface energy having no nucleus for locating the marks formed as a result of the temperature rise. Therefore, if there exist needle-like recesses 28, the recording marks are trapped by the small roughnesses 28. The mark shape at this time is circular and consequently the surface energy is the smallest. This phenomenon occurs in the case of TbFeCo, an ordinary magnetooptical recording material, and often occurs particularly in a medium having a low coercive force. This tendency is higher in Pt/Co which is frequently used in a short wavelength range, compared to TbFeCo.

Figure 16:
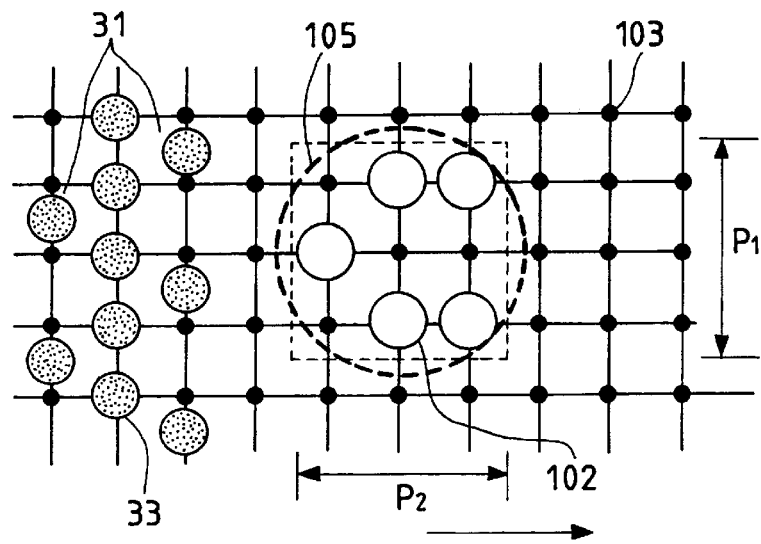
FIG. 16 is a plan view for explaining the relation between the recorded marks and the reproducing spots.

As shown in FIG. 16, the recording marks are two-dimensionally arranged and information is recorded. For the mark recording method, the medium structure and the recording/reproducing system as disclosed in PCT patent application No. PCTJP95/00542 are used to arrange the marks on a two-dimensional lattice. In this arrangement, at least three marks are provided in advance at regular intervals in the spot movement direction indicated by an arrow. Of these marks, two are a mark set 31 of transversely displaced marks, and one mark 33 is provided on the center line of spot movement. From the two marks 31, a track displacement signal is detected by the pre-wobbling method disclosed in our Japanese Patent Application No. 142868/1994. The spots are transversely located by using the detection signal. From another mark string 33 appearing at regular interval, a clock signal corresponding to the two-dimensional lattice interval is generated in synchronism with the marks 33. By using this clock, marks are recorded in the data recording area subsequent to the three marks by using at least one spot. Then, recording marks 102 can be provided on a two-dimensional lattice 103.

The information to be recorded is recorded as the information block which is composed of recording mark strings having longitudinal and lateral repetition periods $P_i$ and $P_2$.

Figure 31A:
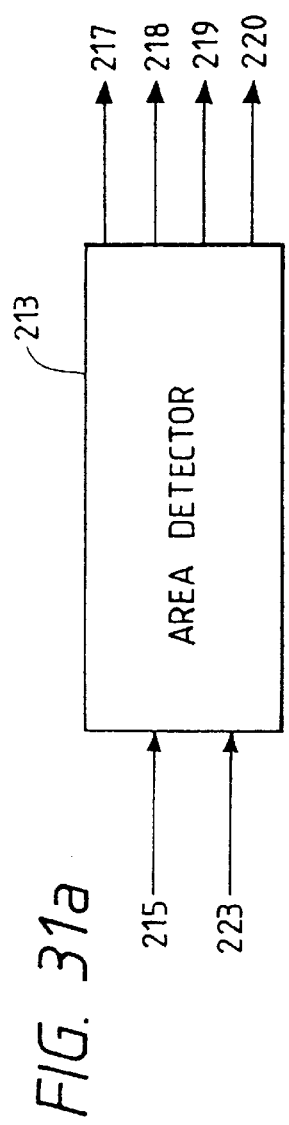
FIGS. 31a and 31b are diagrams for explaining the timings of output signals from an area detector.
Figure 31B:
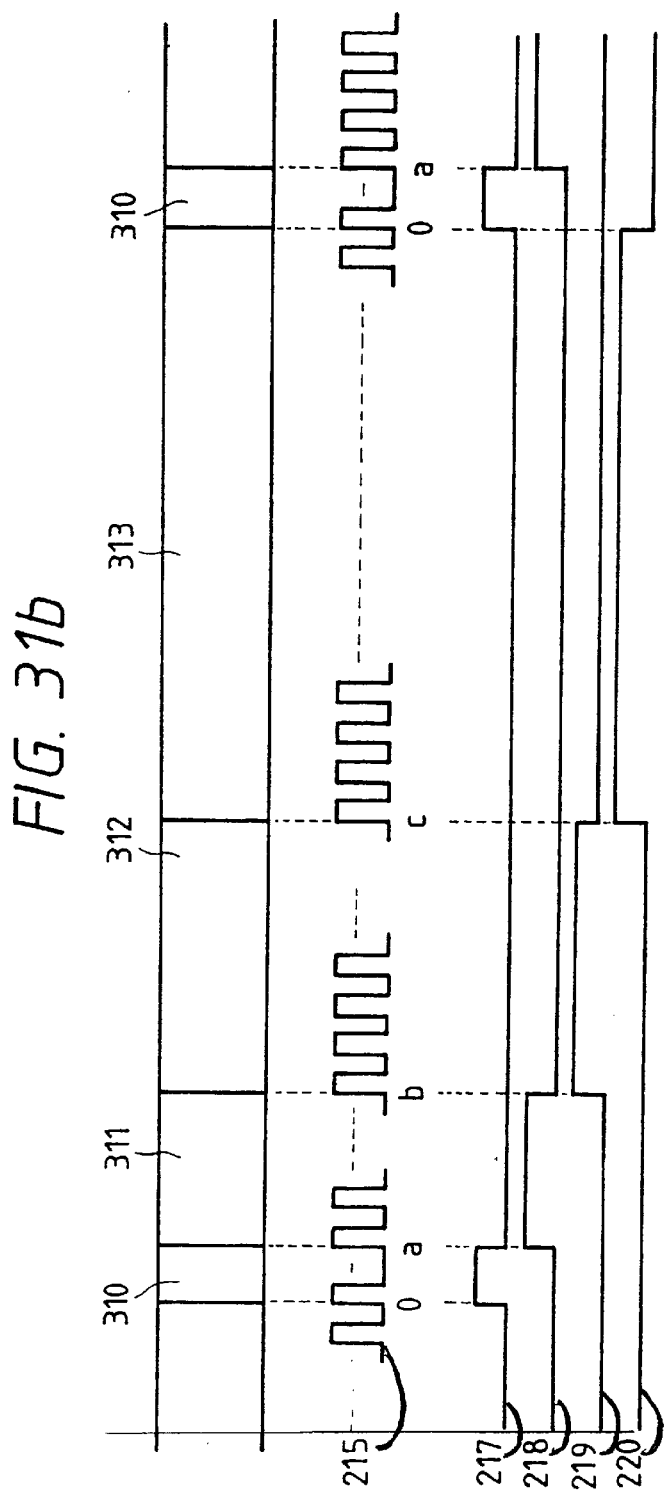

As shown in FIG. 31b, the information block has a concept of a sector of the prior art in the circumferential direction of the optical disk and an address area 310, a timing area 311, a learning area 312 and a data storage area 313 in the recited order from the head. The marks (including the pre-pits) contained in those areas are formed at predetermined periods from the head position of the sector on predetermined lattice points 103. In the address area 310, as the pre-pits, specific patterns indicating the head of the sectors and sector addresses are formed in advance. In the timing area 311, the timing marks are at the lattice points on each recording mark string. The strobe pulses to be used for recording the recording marks at the lattice points or for sampling the signals at the lattice points are produced or corrected by using a PLL circuit on the basis of the detection signals of the timing marks. The information is expressed by the presence or absence of the recording mark 102 at the lattice point 103 to be recorded. The optical system for forming the light spot and the tracking and auto-focusing the light spot can be exemplified by known means. Moreover, signals 217, 218, 219 and 220 for detecting those individual areas can be generated by a count value 215 counted referring to the pre-pits of the address area.

Here will be described the method of detecting the recording marks by the present embodiment, i.e., by the method of reproducing information.

When a plurality of recording marks 102 are two-dimensionally arranged in a reproducing light spot 105, as shown in FIG. 16, the diffracted light passing through the objective lens is a super-position of the light of 0 order and light of ±1 order, which are two-dimensionally distributed in the longitudinal and lateral directions.

Figure 17:
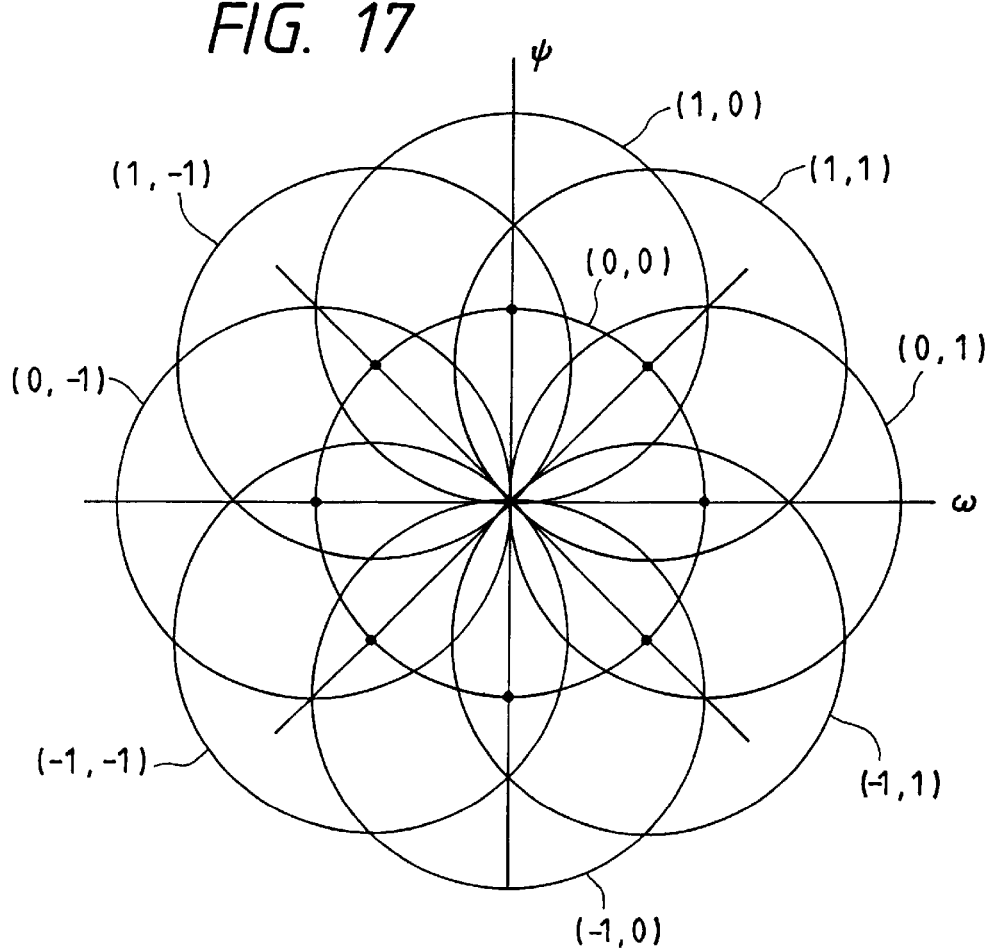
FIG. 17 is a diagram for explaining the distribution of diffracted light.

FIG. 17 shows the diffracted lights of the individual orders when the orders of the longitudinal and transverse diffracted lights are expressed by (longitudinal, lateral). In short, the resultant diffracted light is a combination of nine diffracted lights (−1, −1), (−1, 0), (−1, 1), (0, −1), (0, 0), (0, 1), (1, −1), (1, 0), (1, 1). Nine photodetectors are required for separately detecting the diffracted lights of the individual orders.

Figure 18:
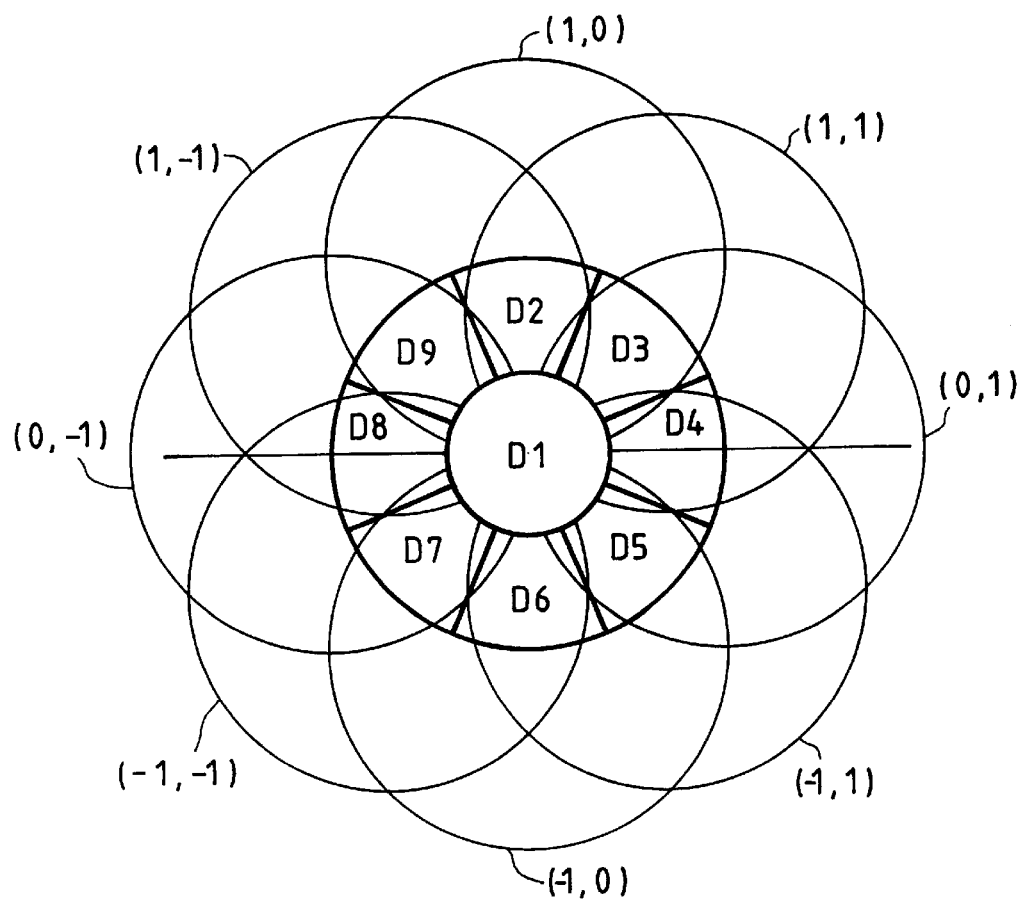
FIG. 18 is a diagram showing the arrangement of a split photodetector.

FIG. 18 shows an example of a photodetector having circumferentially split detectors D1 to D9. From the detectors D2 to D9, only the three diffracted lights excepting that of order (0, 0) are superposed to facilitate their calculations. Moreover, the central detector D1 is less influenced by the individual diffracted lights excepting that of the order (0, 0), so that only the diffracted light of order (0, 0) may be almost detected.

Figure 14:
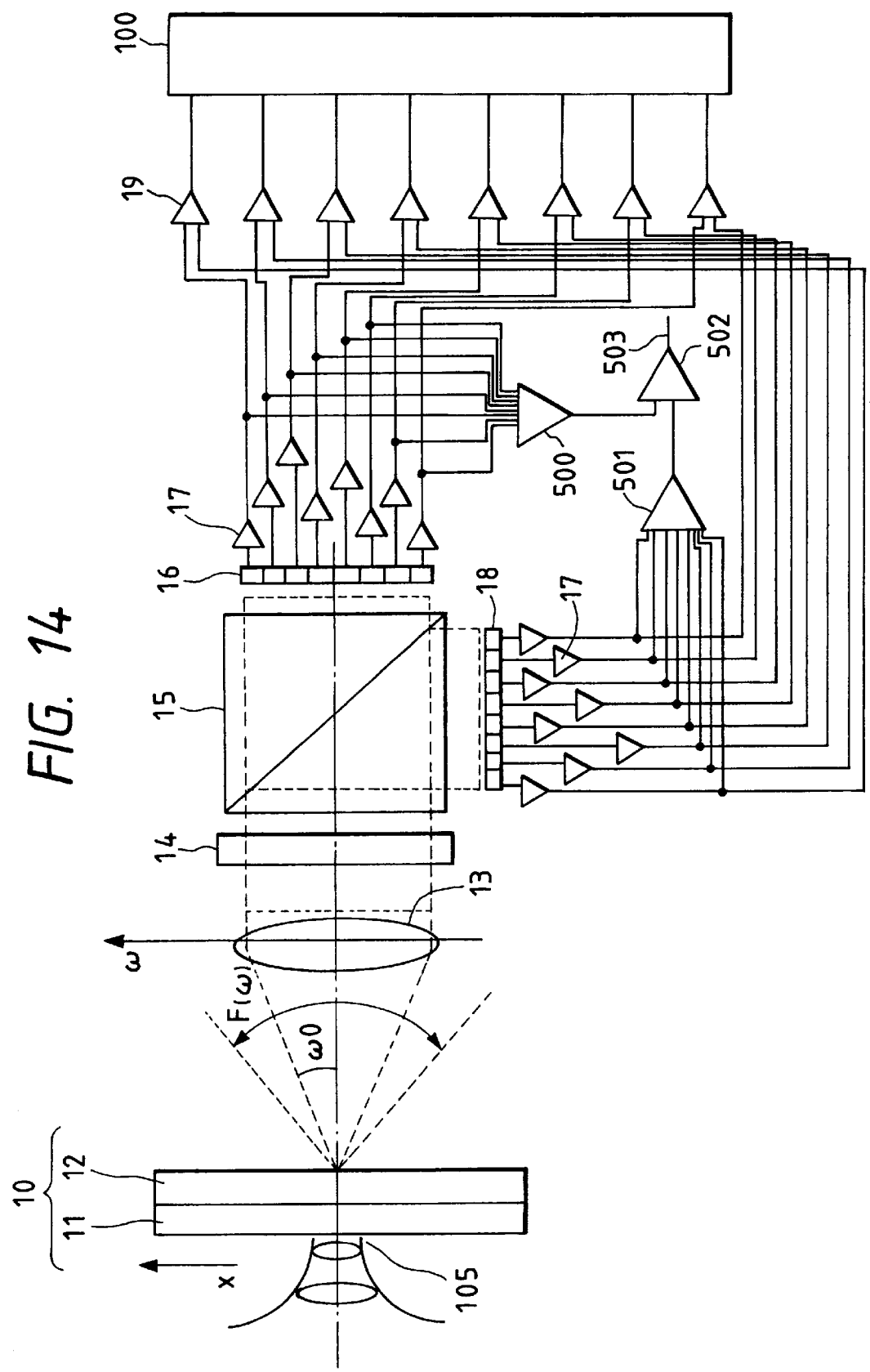
FIG. 14 is a schematic diagram of a signal detecting system.

With reference to FIG. 14, an example of the signal reproducing device will be described. FIG. 14 shows a transmission type detecting optical system. The carrier layer side of the magnetooptical disk 10 composed of a carrier layer 11 and a recording layer 12 is irradiated with the reproducing light spot 105, and the transmitted diffracted light is condensed by the objective lens 13. The optical beam having passed through the objective lens 13 is divided through the half-wave plate 14 and the polarizing prism 15 into P-polarized light and the S-polarized light, which are detected by the split detectors 16 and 18 each comprising nine detectors and arranged as shown in FIG. 18, with respect to the zero-order light. The detection signals from the split detectors 16 and 18 are individually subjected to current-voltage conversion by the amplifiers 17. After this, the magnetooptical signals from the distribution of the nine diffracted lights are detected by taking the difference between the portions where the regions of the diffracted light distribution are equal to each other by differential amplifiers 19. These magnetooptical signals are processed by a reproduced signal circuit 100 and they are detected as the reproduced signals. The reflection type detecting optical system is different only in that the light spot projecting light source is provided on the same side as that of the objective lens 13, and the other parts can be realized by a structure similar to that of FIG. 14.

Incidentally, in the structure of FIG. 14, the wiring to the current-voltage converting amplifiers 17 is long, so that they are liable to be influenced due to the external noise by the characteristics as the current source of the photodetector. Hence the wiring must be shortened. Moreover, as many as twenty-seven amplifiers including the current-voltage converting amplifiers and the differential amplifiers are required, and their number has to be reduced.

Figure 19:
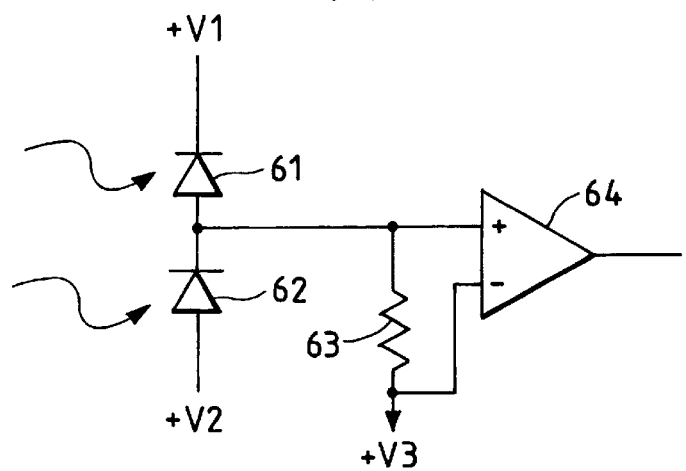
FIG. 19 is a circuit diagram showing a method of connecting the detectors.

FIG. 19 shows a structure capable of taking a difference in the state of photocurrent. This structure is suitable when the signals from a plurality of photodetectors are processed. Specifically, the terminals of photodetectors 61, 62 having different polarization angle and the same regions of diffracted light distribution are connected in series, voltages V1 and V2 are applied to the terminals, and a voltage V3 is applied to the node of the terminals of the photodetectors 61, 62 through a resistor 63. Assuming that V1>V3>V2, the direction in which the current flows from the photodetector 61 to the resistor 63 is opposite to the direction in which the current flows from the photodetector 62 to the resistor 63. As a result, the difference of the current to flow through the resistor 63 can be detected by an operational amplifier 64. The amplitude f(x) of light on the disk is expressed by the following Equation (1), $$f(x)=s(x,y)t(x,y) \qquad (1).$$

Where x and y represents the position the disk, $\omega$ and $\psi$ are the angle variables of emitted light, s(x, y) is the amplitude of the light spot 105, and t is the amplitude on the disk, as shown in FIG. 14.

Hence, the angular distribution F($\omega$, $\psi$) of the emitted light can be expressed by the following Equation (2), using the Fourier transformation S($\omega$, $\psi$) of the s(x, y) and the Fourier transformation T($\omega$, $\psi$), of the t(x, y), $$F(\omega,\psi)=S(\omega,\psi)*T(\omega,\psi) \qquad (2)$$

where symbol * designates the convolution.

Now, if a recording mark having an amplitude $t_1(x, y)$ is recorded on the disk face, the amplitude t(x, y) on the disk face and its Fourier transformation T($\omega$, $\psi$) are expressed by the following Equations (3) and (4):

$$t(x,y)=t_1(x,y) \qquad (3);$$

$$T(\omega,\psi)=T_1(\omega,\psi) \qquad (4).$$

Now, assume that the recording marks $t_1(x, y)$ are arranged on a plurality of disk at the same repetition period as that of the spot size p. Here, this spot size p is expressed by the following Equation, $$p=\lambda/NA \qquad (5); \text{ and}$$

$$\omega_0=\psi_0=2\pi/p=2\pi NA/\lambda \qquad (6).$$

Where $\lambda$ is the wavelength of light of the light source, and NA is the numerical aperture of the optical system.

Then, the value $t_1(x, y)$ is expressed by the Fourier series of the following Equation (7):

$$t_1(x,y) = \sum_{l=-\infty}^{+\infty} \sum_{m=-\infty}^{+\infty} R_1(m, l)\exp(j2\pi(mx + ly)/p). \qquad (7)$$

The Fourier coefficient $R_1(m, 1)$ is given by the following Equation (8):

$$R_1(m,l) = \left(\frac{1}{p}\right)^2 \int \int_{-p/2}^{+p/2} t_1(x,y)\exp(-2j\pi(mx + ly)/p)dxdy. \qquad (8)$$

When $R_1(m,l)$ is expressed by the Fourier coefficient, the distribution of the quantity of light on the objective lens face can be expressed by the superposition of the diffracted light corresponding to the individual Fourier coefficients, as follows:

$$F(\omega,\psi) = \sum_{n=-1}^{+1} \sum_{q=-1}^{+1} R(n, q)S(\omega - n/p, \psi - q/p). \qquad (9)$$

Here, it will be seen that the diffracted light F(n, q) of (n, q) order, if normalized in terms of $\omega_0$ and $\psi_0$, has a center of distribution at a point (n, q) on the objective lens, an extension of distribution over a range of $\pm 1$ around the center, and the Fourier coefficient R(n, q) as a complex amplitude. As a result, the center of the diffracted light of high order is apart from the origin outside the aperture of the objective lens. Hence, the diffracted light capable of passing the aperture by the present calculations is up to the light of order $\pm 1$.

Figure 20:
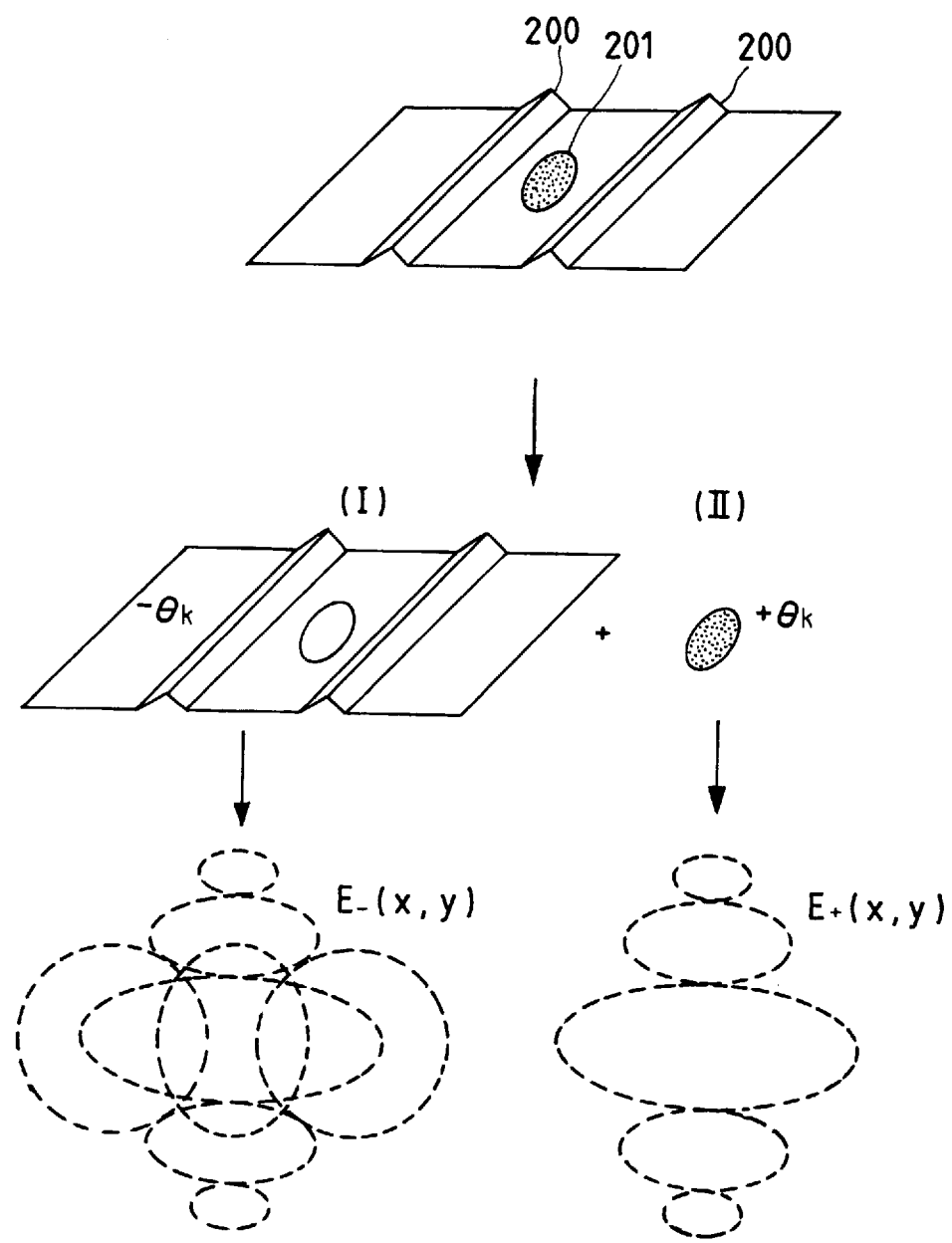
FIG. 20 is a diagram for explaining a signal detecting model.

With reference to FIG. 20, consider a model of a detection system of a magnetooptical disk having a track defined by a groove 200, in which the components of the polarized light whose plane of polarization is rotated by 45 degrees with respect to the S-polarization and the P-polarization are detected by the detectors A and B to take the difference between the detection signals. Specifically, the recorded magnetic pattern is deemed as a combination of two states, an unrecorded state (I) and a recorded state (II) of a recording mark 201, to determine the diffracted light distribution from each pattern. The polarization rotation in the recorded state is represented by $+\theta_k$, and this notation related to this state is expressed by "+". The polarization rotation in the unrecorded state is represented by $-\theta_k$, and this notation on this state is expressed by "−".

Figure 21A:
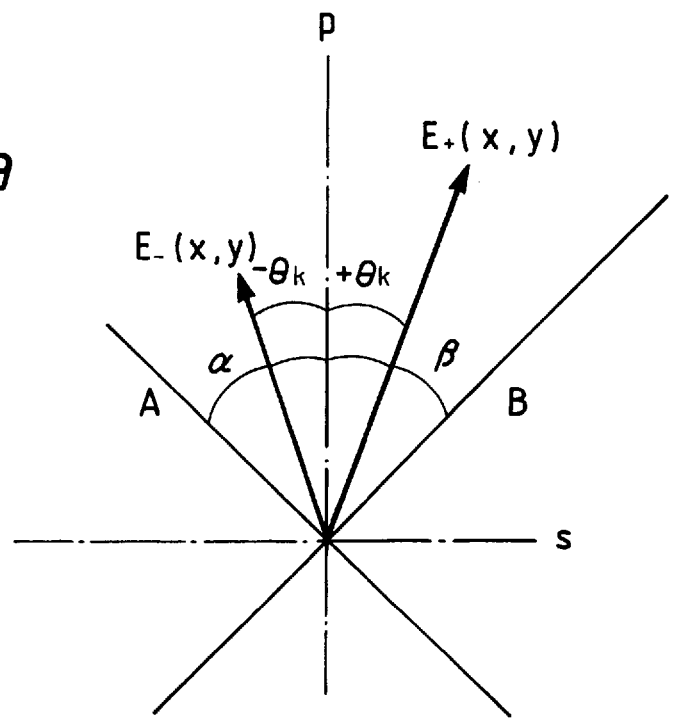
FIGS. 21a and 21b are diagrams for explaining the addition of the vectors of diffracted light.

In FIG. 21a, the incident polarization angle is the P-polarization, the Kerr rotation angle is changed to $\pm\theta_k$ in accordance with each recorded state, and the set angles of the photodetectors A and B from the P-polarization are respectively set to $\alpha$ and $\beta$. The vector E, considering the polarization direction of the diffracted light from the recording mark, can be expressed by the following Equation as the sum of the diffracted light vector $E_-$ from the mark in the unrecorded state and the diffracted light vector $E_+$ from the mark in the recorded state:

$$E=E_++E_- \qquad (10).$$

Figure 21B:
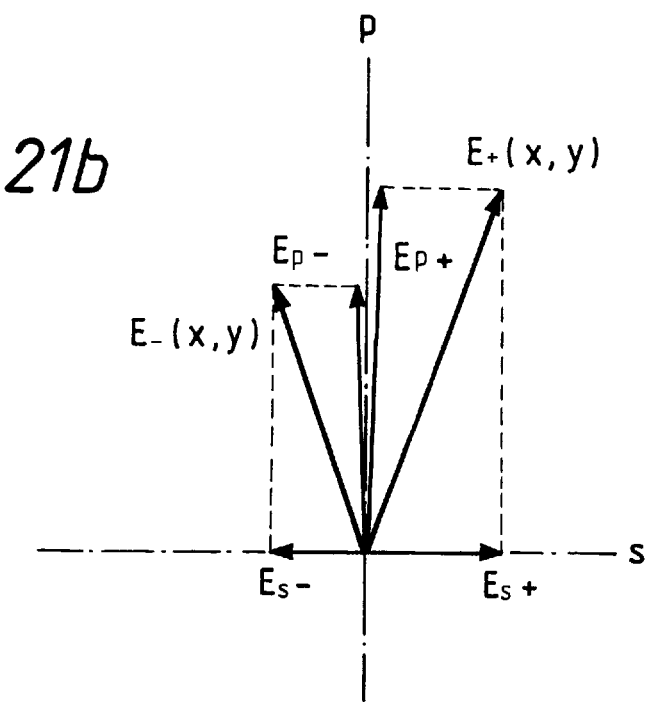

Each vector is decomposed into the component $E_s$ of the S-polarization axis and the component $E_p$ of the P-polarization axis, as shown in FIG. 21b:

$$E=E_s+E_p \qquad (11);$$

$$E_p=E_{p+}+E_{p-} \qquad (12);$$

$$E_s=E_{s+}+E_{s-} \qquad (13).$$

The projected component $E\alpha''$ on the detector A and the projected component $E\beta''$ on the detector B are expressed by the following Equations (14) and (15)

$$E\alpha'' = (E_{p+}'' + E_{p-}'')\cos\alpha + (E_{s+}'' + E_{s-}'')\sin\alpha; \quad (14)$$

$$E\beta'' = (E_{p+}'' + E_{p-}'')\cos\beta + (E_{s+}'' + E_{s-}'')\sin\beta. \quad (15)$$

where the components of the vectors are expressed by the symbol".

The differential output D in each position of each diffraction distribution is expressed by the following Equation (16):

$$D = E\alpha''^2 - E\beta''^2 \quad (16).$$

If the sum of the set angles of the detectors is $\pi/2$, $$D = \{(E_{p+}'' + E_{p-}'')^2 - (E_{s+}'' - E_{s-}'')^2\}(\cos^2\alpha - \sin^2\alpha) + \quad (17)$$

$$2(E_{p+}'' + E_{p-}'')(E_{s+}'' - E_{s-}'')\sin 2\alpha.$$

If the angle $\alpha$ is 45 degrees, $$D = 2(E_{p+}'' + E_{p-}'')(E_{s+}'' - E_{s-}'') \quad (18)$$

The latter term of the above Equation (18) is independent from the mark, considering the term as in FIG. 21. Specifically, in this model, the polarity of the amplitude of the mark in the recorded state is opposite to that of the amplitude of the mark in the unrecorded state. In the vector component of the diffracted light distribution, therefore, the sign – implies the inversion of the polarity of the mark on the disk face. Then, the component of $-E_{s-}''$ is the diffracted light distribution from the pattern when the polarization rotation in the unrecorded state is changed from $-\theta_k$ to $+\theta_k$. In this pattern, the polarization rotation angles in the recorded state and in the unrecorded state are equal to each other, so that the term $(E_{s+}'' - E_{s-}'')$ is equalized to the polarization component of the diffracted light distribution from the state that there is no recording mark, as in the Equation (18). Hence, the output of the photodetector depends only upon the term $(E_{p+}'' + E_{p-}'')$, and the signal characteristics are determined by not the intensity but the amplitude of the diffracted light distribution.

In the magnetooptical disk, a mutual product may be taken of the diffracted light component of $(E_{p+}'' + E_{p-}'')$ and the S-polarization component of the diffracted light distribution of the unrecorded portion. Since the Fourier transformation of the unrecorded portion is a delta function, the distribution on the objective lens face when only one mark is present is expressed by a function of $\omega$ and $\psi$ by the following Equation, wherein the symbol * indicates a complex conjugate:

$$I(\omega, \psi) = \sum_{n=-1}^{+1} \sum_{q=-1}^{+1} \times \\ R(n, q) \times \\ S(\omega - n/p, \psi - q/p)S^*(\omega, \psi) \quad (19)$$

Since the values taken by n and q are from –1 to +1, the ranges for the term $S(\omega - n/p, \psi - q/p)S^*(\omega, \psi)$ on the $\omega$ and $\psi$ axes for the individual values n and q are illustrated in FIG. 17.

Moreover, a mark arrangement block having longitudinal and lateral lengths of p is divided like a net composed of M longitudinal lines and N lateral lines at longitudinal lattice intervals $\delta$ and at transverse lattice intervals $\sigma$, lattice points M×N are provided and the marks are provided on the block. If the mark arrangement is defined as follows:

$a_{i,r}=1$: with mark at a point of coordinates (i, r);
$a_{i,r}=0$: with no mark at point of coordinates (i, r), the distribution on the photodetector face is given by the following Equation:

$$I(\omega, \psi) = \sum_{n=-1}^{+1} \sum_{q=-1}^{+1} \times \\ \{R(n, q)C(n, q, x_0)\} \times \\ S(\omega - n/p, \psi - q/p)S^*(\omega, \psi) \quad (20)$$

If the area is divided by the nine sections on the $\omega$ and $\psi$ axes of FIG. 17 and if the quantities of light are detected by the split detectors D1 to D9, as shown in FIG. 18, the detected output B(m) of the m-th detector is given:

$$\begin{aligned}
B(1) = & \; R(-1, 1)C(-1, 1)D(1, -1, 1) + \\
& R(-1, 0)C(-1, 0)D(+1, -1, 0) + \\
& R(-1, -1)C(-1, 1)D(1, -1, -1) + \\
& R(0, 0)C(0, 0)D(1, 0, 0) + \\
& R(1, 1)C(1, 1)D(1, 1, 1) + \\
& R(1, 0)C(1, 0)D(1, 1, 0) + \\
& R(1, -1)C(1, -1)D(1, 1, -1) + \\
& R(0, -1)C(0, -1)D(1, 0, -1) + \\
& R(0, 1)C(0, 1)D(1, 0, 1)
\end{aligned} \quad (21\text{-}1)$$

$$\begin{aligned}
B(2) = & \; R(1, 0)C(1, 0)D(2, 1, 0) + \\
& R(1, -1)C(1, -1)D(2, 1, -1) + \\
& R(1, 1)C(1, 1)D(2, 1, 1) + \\
& R(0, 0)C(0, 0)D(2, 0, 0)
\end{aligned} \quad (21\text{-}2)$$

$$\begin{aligned}
B(3) = & \; R(1, 1)C(1, 1)D(3, 1, 1) + \\
& R(1, 0)C(1, 0)D(3, 1, 0) + \\
& R(0, 1)C(0, 1)D(3, 0, 1) + \\
& R(0, 0)C(0, 0)D(3, 0, 0)
\end{aligned} \quad (21\text{-}3)$$

$$\begin{aligned}
B(4) = & \; R(0, 1)C(0, 1)D(4, 0, 1) + \\
& R(1, 1)C(1, 1)D(4, 1, 1) + \\
& R(-1, 1)C(-1, 1)D(4, -1, 1) + \\
& R(0, 0)C(0, 0)D(4, 0, 0)
\end{aligned} \quad (21\text{-}4)$$

$$\begin{aligned}
B(5) = & \; R(-1, 1)C(-1, 1)D(5, -1, 1) + \\
& R(0, 1)C(0, 1)D(5, 0, 1) + \\
& R(-1, 0)C(-1, 0)D(5, -1, 0) + \\
& R(0, 0)C(0, 0)D(5, 0, 0)
\end{aligned} \quad (21\text{-}5)$$

$$\begin{aligned}
B(6) = & \; R(-1, 1)C(-1, 1)D(6, -1, 1) + \\
& R(-1, 0)C(-1, 0)D(6, -1, 0) + \\
& R(-1, -1)C(-1, -1)D(6, -1, -1) + \\
& R(0, 0)C(0, 0)D(6, 0, 0)
\end{aligned} \quad (21\text{-}6)$$

$$\begin{aligned}
B(7) = & \; R(-1, -1)C(-1, -1)D(7, -1, -1) + \\
& R(-1, 0)C(-1, 0)D(7, -1, 0) + \\
& R(0, 1)C(0, 1)D(7, 0, 1) + \\
& R(0, 0)C(0, 0)D(7, 0, 0)
\end{aligned} \quad (21\text{-}7)$$

$$\begin{aligned}
B(8) = & \; R(0, 1)C(0, 1)D(8, 0, 1) + \\
& R(-1, -1)C(-1, -1)D(8, -1, -1) + \\
& R(1, -1)C(1, -1)D(8, 1, -1) + \\
& R(0, 0)C(0, 0)D(8, 0, 0)
\end{aligned} \quad (21\text{-}8)$$

$$\begin{aligned}
B(9) = & \; R(0, 1)C(0, 1)D(9, 0, 1) + \\
& R(1, -1)C(1, -1)D(9, 1, -1) + \\
& R(1, 0)C(1, 0)D(9, 1, 0) + \\
& R(0, 0)C(0, 0)D(9, 0, 0)
\end{aligned} \quad (21\text{-}9)$$

Here: the coefficient R indicates the contribution of the island mark to the diffracted light, the first term in the parentheses indicates the order of the diffracted light in the lateral direction of the block, and the second term indicates the order of the diffracted light in the longitudinal direction of the block. The coefficient C indicates the contribution of the arrangement of a plurality of marks to each diffracted light; and the terms in the parentheses are identical to those of the coefficient R. The coefficient D indicates the contribution of the spot to the diffracted light, the first term in the parentheses indicates the number of the split photodetector, and the second and third terms indicate the orders of the diffracted light in the lateral and longitudinal directions of the block, respectively.

The term C(n, q) is expressed by the following Equation (22), and the term D(k, n, q) is expressed by the following Equation (23):

$$C(n, q) = \sum_{i=0}^{M-1} \sum_{r=0}^{N-1} a_{i,r} \exp(j2\pi(ni\delta + qr\sigma)/p); \quad (22)$$

$$D(k, n, q) = \int S(\omega - n/p, \psi - q/p) S^*(\omega, \psi) d\omega d\psi. \quad (23)$$

The nine values are determined at the individual locations, and the Fourier transformations of the spot distribution and the recording marks are determined. Then, the R(n, q) relating to the mark shape and the D(k, n, q) relating to the spot distribution are determined. Since there are only nine unknowns C(n, q) relating to the remaining mark arrangement, Equations (21-1) to (21-9) can be solved to find the values. If the C(n, q) is determined, for example, the inverse Fourier transformation can be executed to determine the values $a_{i,r}$ of the coordinates (i, r) from the following Equation (24), using the spot center as the origin:

$$a_{i,r} = \sum_{n=-1}^{+1} \sum_{q=-1}^{+1} C(n, q) \exp(-j2\pi(ni\delta + qr\sigma)/p). \quad (24)$$

Here, if the longitudinal and lateral lattice intervals $\delta$ and $\sigma$ are one-third or more of the spot size, they are identical to the number (nine) of the orders of +/− of the diffracted light, so that the calculation can be suitably facilitated.

The data to be recorded on the optical disk are recorded in such a way that "1" corresponds to the presence of a mark on a lattice point and "0" corresponds to the absence of a mark recorded in the optical disk. Consequently, by detecting the values $a_{i,r}$ of the aforementioned coordinates (i, r), the information recorded on the disk can be reproduced.

If the light spot is distorted by the aberration, the value D(k, n, q) changes. Then, the preset value D deviates and the correct value C cannot be determined. The light spot distribution without any aberration can be determined by the diffraction calculations, and this calculated value is set at first. The aberrations include the coma due to the inclination of the objective lens and the disk, the astigmatism of the semiconductor laser or the light source, the astigmatism due to thickness variation of the disk substrate, various aberrations due to the misalignment of the elements of the optical system, and the spherical aberration due to the shift of focus. These aberrations hardly change in block units indicating the divisions of the data which are dividedly recorded on the track. Therefore, for each block a learning area is provided in advance to record the learning pattern. In this area, the values D(k, n, q) and R(n, q) are determined during the reproduction, and the calculation of the subsequent data portion are executed by using the values D and R which are detected in the learning area.

Figure 22:
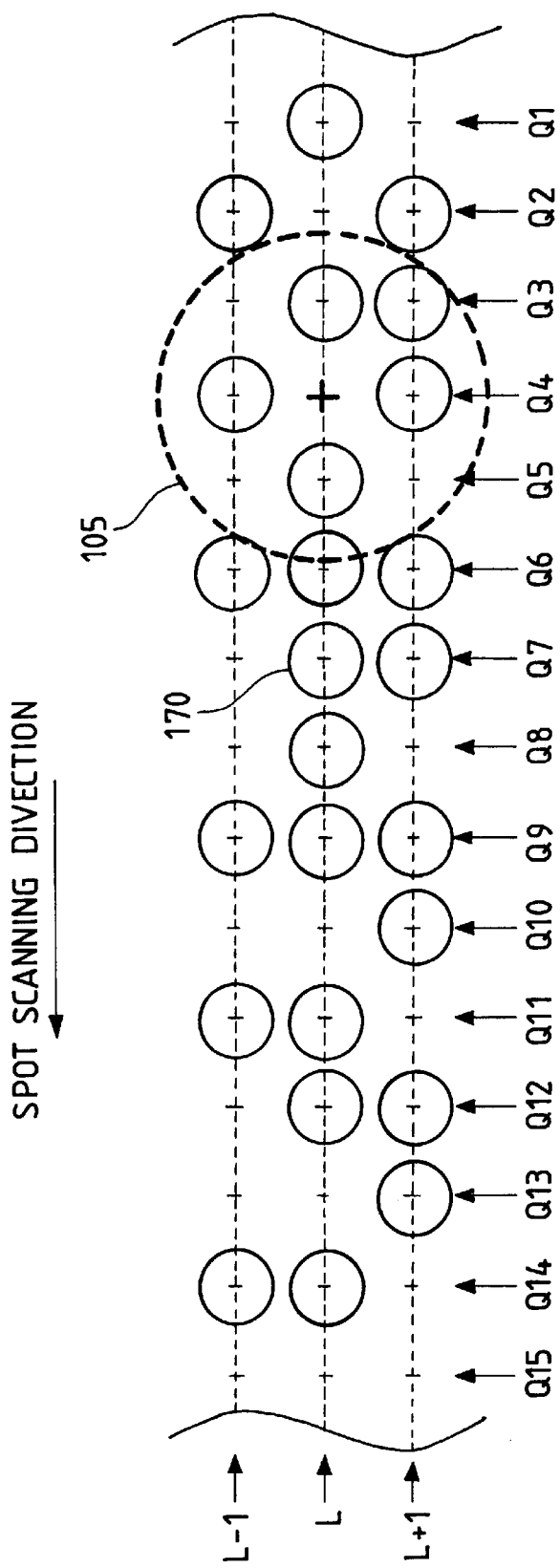
FIG. 22 is a diagram for explaining an arithmetic coefficient learning area.

With reference to FIG. 22, here will be described a coefficient learning method, taking an example in which the reproduction information block, i.e., the signal processing unit, is constituted over three information tracks L−1, L, and L+1. In the learning area, marks for learning the coefficients are required for processing the signals during the information reproduction. These marks may be recorded as isolated marks located on the lattice points of the central information track. Moreover, the marks may be formed in advance as a pre-pits or recorded before the disk is shipped.

When the reproduction information block is composed of the three information tracks, a coefficient learning mark pattern 170 as shown in FIG. 22 is recorded at predetermined lattice points on the central information track.

First of all, when the center of the light spot 105 reaches the lattice point, and when there is formed a learning mark which does not extend to the area of the light spot excepting the isolated mark on the lattice point, then C(n,g)=1. This is because the coefficient C indicating the mark arrangement is 1 because of the single mark, so that only the diffraction component of the isolated mark is effective. Therefore, when the values of the individual split photodetectors are determined in this state, there is determined a relation between the coefficients R and D of the spots and the mark shape. Likewise, since there are nine locations of the lattice points relating to the spot and including those on the adjoining tracks, the possible number of patterns of the marks arranged at the nine lattice points is two to the ninth power, i.e., five hundred twelve. In other words, the value C(n, q) is different for each pattern.

On the other hand, the number of the coefficients of the product of R and D in the Equations (21-1) to (21-9) is forty-one. These coefficients are four, as seen from the Equation (21-2),

R(1, 0)D(2, 1, 0), R(1, −1)D(2, 1, −1),

R(1, 1)D(2, 1, 1), and R(0, 0)D(2, 0, 0).

One value of the reception signal of the photodetector D2 is found for one learning pattern of one block. Now, let the reception signal of the detector D2 by the first learning pattern be B(the photodetector signal, the learning pattern No.), and the coefficient indicating the contribution of the diffracted light by the pattern arrangement be at C(n, q, the learning pattern No.).

Four coefficients of the products of R and D in the Equation (21-2) are calculated by preparing four patterns as the learning patterns and by storing the outputs of the split photodetector D2. Specifically, the signals B(2, 1), B(2, 2), B(2, 3) and B(2, 4), detected from the four learning patterns, are expressed by the matrix (25), using the aforementioned products of R and D and the coefficient C determined by the four learning patterns:

$$\begin{bmatrix} B(2, 1) \\ B(2, 2) \\ B(2, 3) \\ B(2, 4) \end{bmatrix} = \begin{bmatrix} C(1, 0, 1) & C(1, -1, 1) & C(1, 1, 1) & C(0, 0, 1) \\ C(1, 0, 2) & C(1, -1, 2) & C(1, 1, 2) & C(0, 0, 2) \\ C(1, 0, 3) & C(1, -1, 3) & C(1, 1, 3) & C(0, 0, 3) \\ C(1, 0, 4) & C(1, -1, 4) & C(1, 1, 4) & C(0, 0, 4) \end{bmatrix} \begin{bmatrix} R(1, 0) & D(2, 1, 0) \\ R(1, -1) & D(2, 1, -1) \\ R(1, 1) & D(2, 1, 1) \\ R(0, 0) & D(2, 0, 0) \end{bmatrix}. \quad (25)$$

Moreover, assuming that the signal column vector B representing the photodetector output of each learning pattern, as expressed by the following Equation (26), is the product of the square 4×4 matrix C representing the learning pattern arrangement and the column vector RD representing the contribution of the recording mark and the spot to the diffracted light, the column vector RD can be calculated from the signal column vector B expressed in the Equation (27), using the inverse matrix of the square matrix which is easily calculated from the learning pattern:

$$[B]=[C][RD] \quad (26);$$

$$[RD]=[C]^{-1}[B] \quad (27).$$

As described above, only the four learning patterns are needed for determining the four components of the column vector RD relating to the Equation (21-2). Since each RD has four components, when the coefficient C determined by the four learning patterns as in the calculation using the Equation (21-2) is previously found, the relations of the Equations (26) and (27) can be solved by calculation. Because of the nine components of the product RD relating to the Equation (21-1), however, as the nine different patterns, nine different learning patterns are required. Hence, the learning patterns of at least nine blocks are required to determine all the products RD at once.

results. One conceivable example of the method is a method of providing a plurality of learning mark arrangements repeatedly.

If the coefficients thus learned are used, the arrangement of the recording marks can be accurately determined by algebraically calculating the Equations (21-1) to (21-9) to determine the value C by using the values of products of R and D determined in the learning area, even if the values R of diffraction order are changed by the change of the mark shape and even if the light spot is distorted by the aberrations or the like and the amounts of light reception at the individual portions change.

If the signal column vector B representing the photodetector output on a certain lattice point is considered to be the product of the column vector C representing the pattern arrangement of the data and the square matrix RD of 9×9 rows representing the contribution of the recording mark and the spot to the diffracted light, as expressed in the Equations (21-1) to (21-9) or the Equation (28), the calculations of the Equation (29) can be executed from the signal column vector V by using the inverse matrix of the square matrix, as easily calculated, because the components of the square matrix RD have already been determined from the learning patterns.

$$\begin{bmatrix} B(1) \\ B(2) \\ B(3) \\ B(4) \\ B(5) \\ B(6) \\ B(7) \\ B(8) \\ B(9) \end{bmatrix} = \begin{bmatrix} R(-1,1)D(1,-1,1) & R(-1,0)D(1,-1,0) & R(-1,-1)D(1,-1,-1) & R(0,0)D(1,0,0) & R(1,1)D(1,1,1) \\ 0 & 0 & 0 & R(0,0)D(2,0,0) & R(1,1)D(2,1,1) \\ 0 & 0 & 0 & R(0,0)D(3,0,0) & R(1,1)D(3,1,1) \\ R(-1,1)D(4,-1,1) & 0 & 0 & R(0,0)D(4,0,0) & R(1,1)D(4,1,1) \\ R(-1,1)D(5,-1,1) & R(-1,0)D(5,-1,0) & 0 & R(0,0)D(5,0,0) & 0 \\ R(-1,1)D(6,-1,1) & R(-1,0)D(6,-1,0) & R(-1,-1)D(6,-1,-1) & R(0,0)D(6,0,0) & 0 \\ 0 & R(-1,0)D(7,-1,0) & R(-1,-1)D(7,-1,-1) & R(0,0)D(7,0,0) & 0 \\ 0 & 0 & R(-1,-1)D(8,-1,-1) & R(0,0)D(8,0,0) & 0 \\ 0 & 0 & 0 & R(0,0)D(9,0,0) & 0 \end{bmatrix} \quad (28)$$

$$\begin{bmatrix} R(1,0)D(1,1,0) & R(1,-1)D(1,1,-1) & R(0,-1)D(1,0,-1) & R(0,1)D(1,0,1) \\ R(1,0)D(2,1,0) & R(1,-1)D(2,1,-1) & 0 & 0 \\ R(1,0)D(3,1,0) & 0 & 0 & R(0,1)D(3,0,1) \\ 0 & 0 & 0 & R(0,1)D(4,0,1) \\ 0 & 0 & 0 & R(0,1)D(5,0,1) \\ 0 & 0 & 0 & 0 \\ 0 & 0 & R(0,-1)D(7,0,-1) & 0 \\ 0 & R(1,-1)D(8,1,-1) & R(0,-1)D(8,0,-1) & 0 \\ R(1,0)D(9,1,0) & R(1,-1)D(9,1,-1) & R(0,-1)D(9,0,-1) & 0 \end{bmatrix} \begin{bmatrix} C(-1,1) \\ C(-1,0) \\ C(-1,-1) \\ C(0,0) \\ C(1,1) \\ C(1,0) \\ C(1,-1) \\ C(0,-1) \\ C(0,1) \end{bmatrix};$$

$$[C] = [RD]^{-1}[B]. \quad (29)$$

For example, forty-one diffraction components or the products of RD can be determined because the values C at the individual lattice points are known by detecting the outputs of the split photodetectors at the individual lattice points of timings Q1, Q2, Q3, . . . , and Q9 of the pattern of the learning area in FIG. 22. Specifically, the output signals D(1, 1) to D(9, 1) of the photodetectors D1 to D9 are measured when the center of the light spot 105 reaches the lattice point Q1. The output signals D(1, 2) to D(9, 2) of the photodetectors D1 to D9 are measured when the lattice point Q2 is reached. Likewise, at the later lattice points Q3, Q4, . . . , and at last the lattice point Q9, the outputs of the nine photodetectors are measured and stored for every lattice point. On the basis of the aforementioned measured values and the coefficients of the learning mark arrangement of the lattice points Q1 to Q9, the coefficients contributing to the forty-one diffractions or the products of R and D are calculated by using the aforementioned Equation (27). Moreover, the coefficient repeating accuracy can also be enhanced by learning the learning operation several times at a number of lattice points and by averaging the learning The signal processing operation in the information recorded area can be executed by using the coefficients obtained by the aforementioned means and the signals from the individual detectors sampled at the individual lattice point locations by the aforementioned strobe pulses. If the strobe pulses whose timings are corrected by the PLL circuit are used at this time, the information mark detecting signals at the locations of the lattice points can be more accurately sampled.

Here will be described the information recording circuit and the reproducing circuit.

Figure 23:
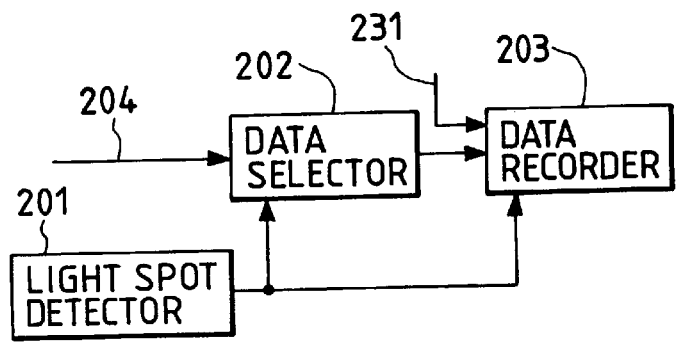
FIG. 23 is a block diagram of a recording circuit.

FIG. 23 is a block diagram of a recording circuit. This recording circuit includes a light spot detector 201, a data selector 202 and a data recorder 203.

Figure 24:
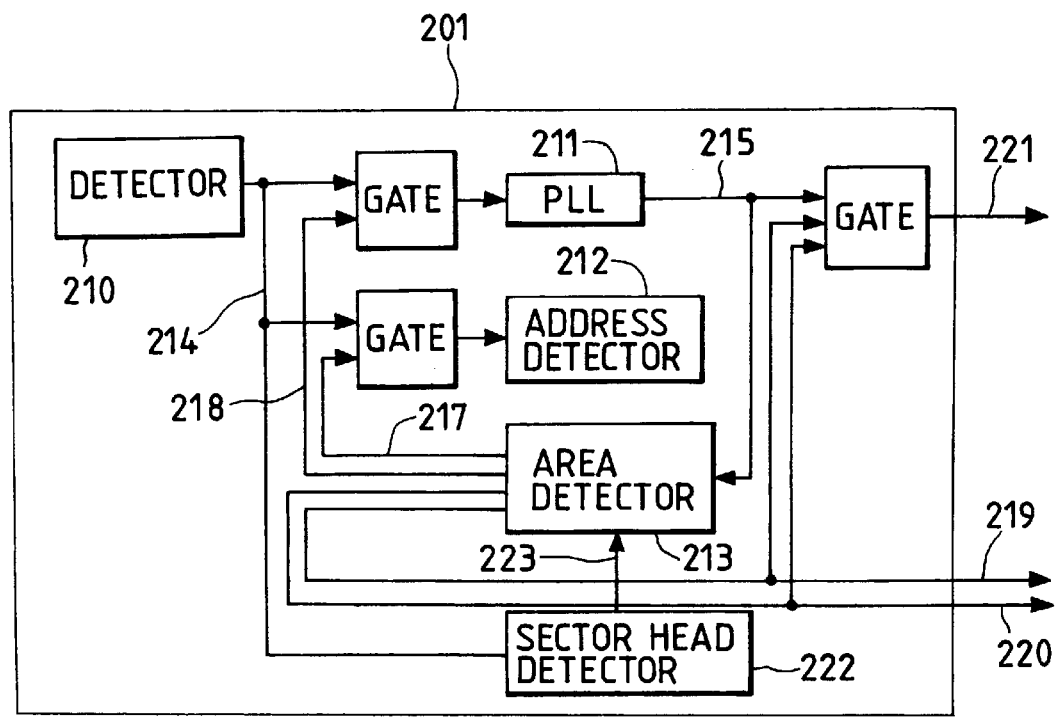
FIG. 24 is a block diagram of one embodiment of the detector.

FIG. 24 shows one example of the detector 201. This detector 201 is composed mainly of a detector 210 for detecting projection-pit signals from the disk, a PLL circuit 211, a sector head detector 222, and an area detector 213. In the case of the magnetooptical disk, for example, the detector 210, as shown in FIG. 14, detects the sum of the signals of the two detectors 16 and 18 so as to detect the recording mark signal. Hence, the signals coming from the split portions of the detector 16 are added by an adder 500. Moreover, the signals coming from the split portions of the detector 18 are also summed up by an adder 501, the output of which is added to the output of the adder 500 by an adder 502. This output 503 is the output of the detector 210. The area detector 213 is a unit for controlling the detector 201 and detects the location of the light spot by counting the strobe pulses 215 which are outputted from the PLL circuit 211, as shown in the timing chart of FIG. 31b. As a result, there are outputted the address area signal 217, the timing area signal 218, the learning area signal 219 and the data storage area signal 220.

The counted value of the strobe pulses is reset at first to 0 by a pulse signal 223 which is outputted from the sector head detector 222. The sector head detector 222 is a circuit for detecting a specific pattern indicating the head of the sector formed in the address areas, on the basis of an output signal 214 coming from the photodetector, and outputs the pulse signal 223 when the specific pattern is detected.

Since the light spot is present in the address area while the counted value of the strobe signal 215 is from 0 to a, only the address area signal 217 is turned on and outputted. When this address area 217 is turned on, the output signal 214 from the photodetector is outputted through the gate circuit to an address detector 212. This address detector 212 is a circuit for detecting the address information formed in the address area, on the basis of the output signal 214.

Since the light spot is present in the timing area while the counted value is a to b, only the timing area signal 218 is turned on and outputted. When the timing area signal 218 is turned on, the output signal 214 from the photodetector is inputted through the gate circuit to the PLL circuit 211. This PLL circuit 211 detects the timing mark formed in the aforementioned timing area, on the basis of the output signal coming from the photodetector, and corrects the timing difference between the aforementioned strobe pulse and the lattice point location by using the detection result. The PLL circuit 211 outputs the strobe pulse 215, which is outputted from the detector 201 through the gate circuit when the aforementioned learning area signal 219 is on or when the aforementioned data storage area signal 220 is on.

Since the light spot is present in the learning area while the counted value is b to c, only the learning area signal 219 is turned on. Since the light spot is present in the data storage area while the counted value is c to 0, only the data storage area signal 220 is turned on and outputted. The learning area signal 219 and data storage area signal 220 are the output signals of the detector 201. As a result, this detector 201 outputs the aforementioned strobe pulse 215, learning area signal 219 and data storage area signal 220.

Figure 25:
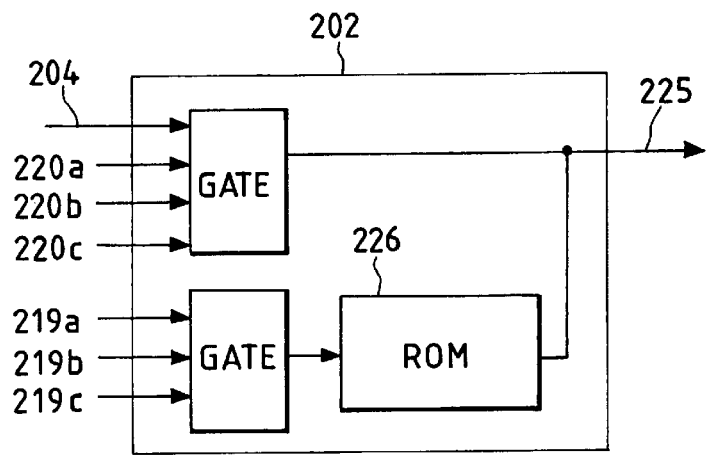
FIG. 25 is a block diagram of one example of a data selector.

FIG. 25 shows one example of the data selector 202. To this data selector 202, there are inputted: user data 204; a plurality of data storage area signals 220a to 220c or the outputs from the detector 210; and a plurality of learning area signals 219. A this time, when the data storage area signals 220 are on, the data selector 202 outputs the user data 204 as serial data 225. When the learning area signal 219 is on, the data series, stored in a coefficient learning data ROM 226, are outputted as the serial data 225 so that the information marks necessary for learning the coefficients R and D may be recorded in the learning area.

Figure 26:
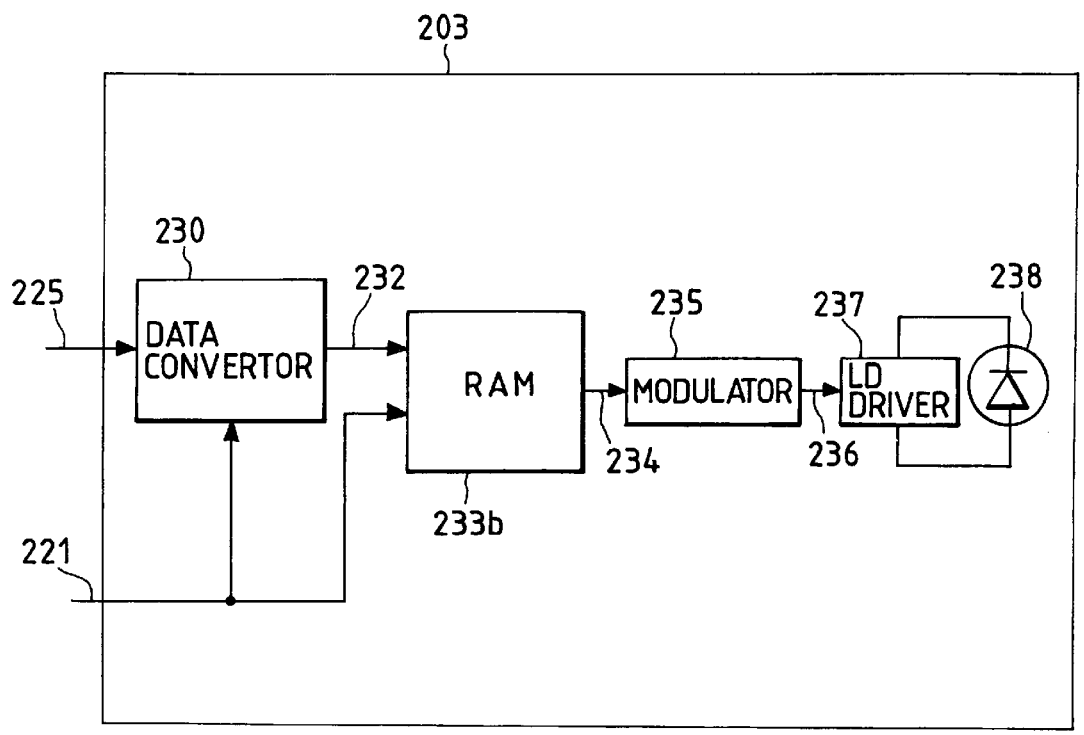
FIG. 26 is a block diagram of one example of a data recorder.

FIG. 26 shows one example of the data recorder 203. To this data recorder 203, there are inputted strobe pulses 221 for the data recording, and the aforementioned serial data 225. At this time, these serial data 225 are converted by a converter 230 into the data to which are added error correcting codes and control codes suited for the characteristics of the optical disk. The converted data 232 are stored in a memory 233 and are read out from the memory 233 by the recording strobe pulses 221. These read data 234 are inputted to a modulator 235. The modulated data 236 are inputted to a laser driver 237 so that the marks are recorded by a light spot 238.

Figure 27:
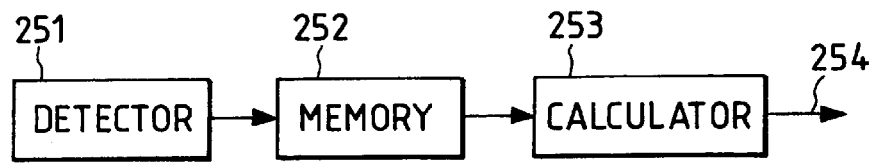
FIG. 27 is a block diagram of an information reproducing circuit.

FIG. 27 is a schematic block diagram showing an information reproducer for reproducing the recorded information. This information reproducer comprises a detector 251, a memory 252 and a calculator 253.

Figure 28:
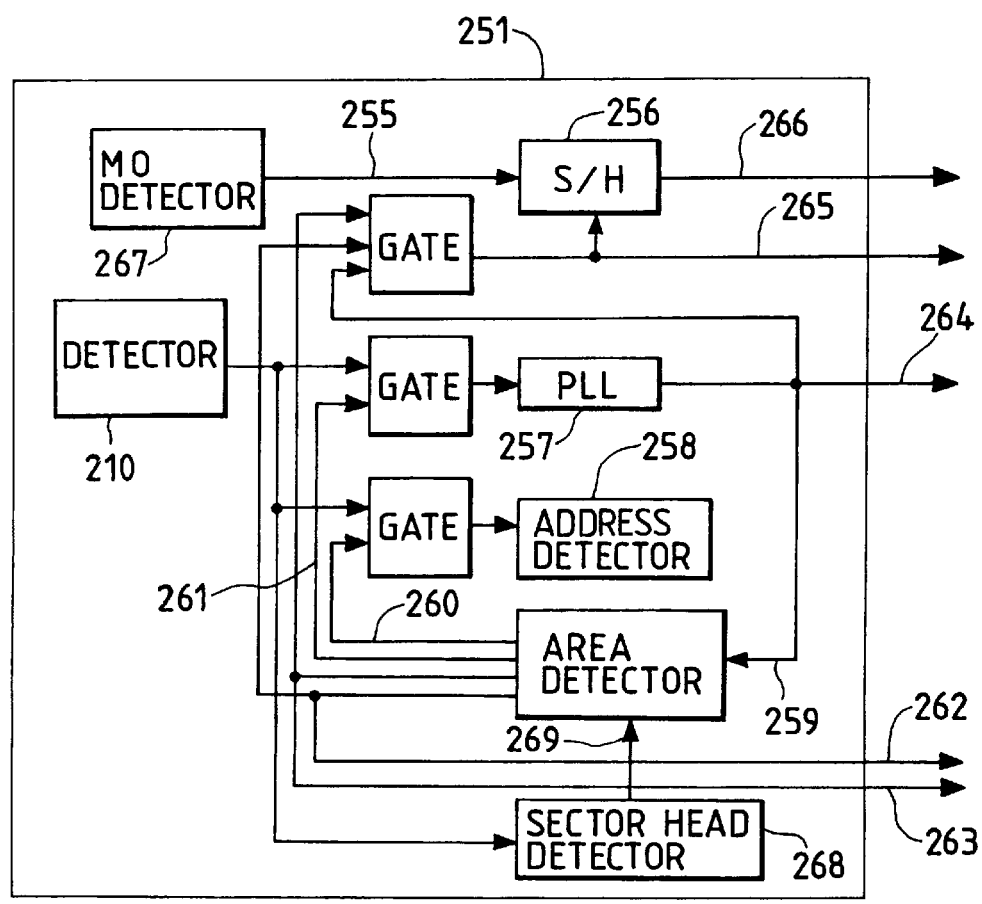
FIG. 28 is a block diagram of one example of the detector.

FIG. 28 shows one example of the detector 251. This detector 251 is composed mainly of a differential amplifier (magnetooptical detector 267) for the outputs of the individual split detectors, a sample-and-hold circuit 256, a PLL circuit 257, a sector head detector 268 and an area detector 259. The PLL circuit 257, the sector head detector 268, the area detector 259 and an address detector 258 are identical to those of the aforementioned data recorder, and the detector 251 is controlled by the area detector 259 like the detector 201 in the recorder.

First, when the light spot enters the timing area, a timing area signal 261, inputted from the area detector 259, is turned on, and the timing mark signal, detected by the light spot, is inputted to the PLL circuit 257 in the detector. On the basis of the timing mark signal, the PLL circuit 257 corrects the phase shift of the strobe pulse 264 due to the irregular rotation of the disk. When a learning area signal 262 is on or when a data storage area signal 263 is ON, the strobe pulse 264 or the output of the PLL circuit 257 serves as the clock 265 of the sample-and-hold circuit 256. In accordance with the clock 265, the sample-and-hold circuit 256 samples the signal values, at the lattice points, of magnetooptical disk detection signals 255 inputted from the individual split detectors. The sampled values are outputted as a detection signal 266 from the detector 251 to the memory 252.

The magnetooptical disk detector 267 is identical to the differential amplifier 19 shown in FIG. 14. Since nine differential amplifiers are provided for each split photodetector, the detection signal 266 includes nine outputs 266a, 266b, . . . , and 266i. FIG. 28 shows the flow of only one signal.

Only when the learning area signal 262 is on or when the data storage area signal 263 is on, the output from the sample-and-hold circuit 256 for generating pulses corresponding to the lattice points is outputted as the control clock 265 to the detector 251 and inputted to the memory 252.

Figure 29:
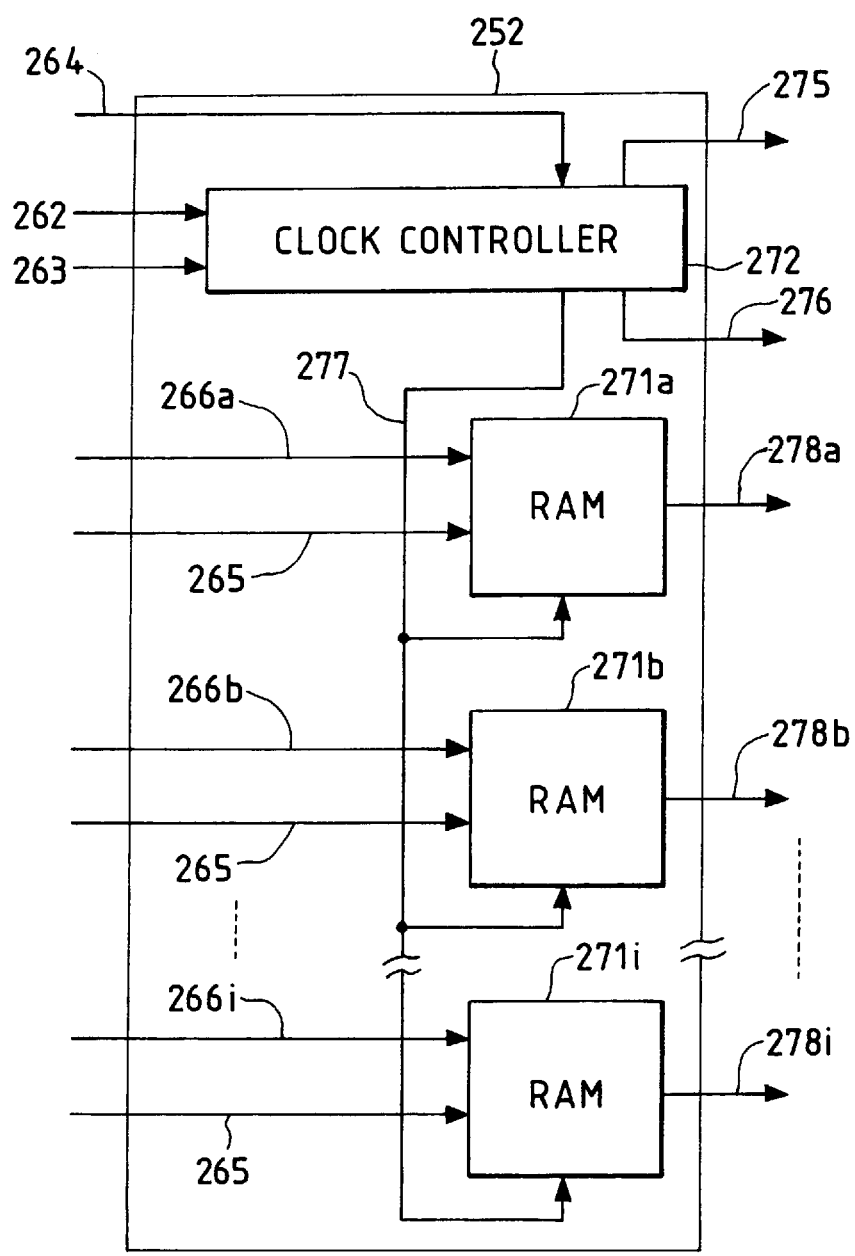
FIG. 29 is a block diagram of one example of a memory section.

FIG. 29 shows one example of the memory 252. This memory 252 is composed mainly of memories and a read clock controller. Here, the sampled-and held outputs of the photodetectors are stored, and the detection signals and the various control signals are synchronized with the read clocks for the calculation. The individual detection signals 266a to 266i, outputted from the detector 251 and inputted to the memory 252, are stored in the memories 271a to 271i, respectively, in accordance with the control clocks 265. Moreover, the signal, which is turned on in synchronism with the read clock when the learning area signal 262 outputted from the detector 251 is on, is made to serve as a learning area signal 275, and the signal, which is turned on in synchronism with the read clock when the data storage area signal 263 outputted from each detector is on, is named a data storage area signal 276.

The individual detection signals 266a to 266i, stored in the individual memories 271a to 271i, are read out in accordance with the output signal 277 of the read clock controller 272 and are outputted as synchronized detection signals 278a to 278i from the memory 252 to the calculator 253. Moreover, the aforementioned learning area signal 275 and data storage area signal 276 are outputted from the memory 252 to the calculator 253. The read clocks are produced by inputting the strobe pulses 264 outputted from the PLL circuit 257 to the read clock controller 272. For high speed inverse Fourier transformation in the calculator, the strobe pulses 264 have to be multiplied to produce the signals synchronized therewith. Therefore, the read clocks are produced, and the detection signals and the various control signals are synchronized in advance with the read clocks.

Figure 30:
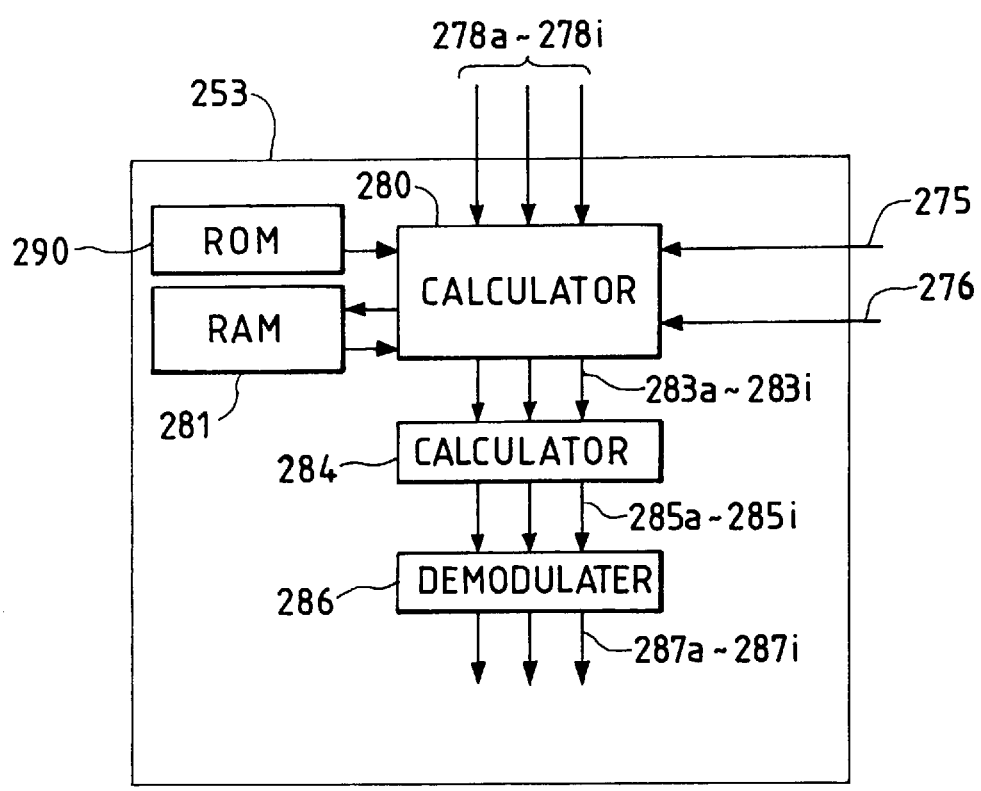
FIG. 30 is a block diagram of one example of a calculator.

FIG. 30 shows one example of the calculator 253. The individual detection signals 278a to 278i, outputted from the memory 252 to the calculator 253, are inputted to the calculator 280. If, at this time, the learning area signal 276 or the input from the memory 252 is on, the calculator 280 reads out the coefficient C representing the contribution to diffraction, calculated from the data series stored in the coefficient learning data ROM 226, from a ROM 290 on the basis of the detection signals 278a to 278i, and calculates the forty-one coefficients of the products of R and D by calculating the inverse matrix on the basis of those coefficients and by performing the calculation expressed by the Equation (27). The operation coefficients thus calculated are stored in an operation coefficient memory 281.

If the data storage area signal 276 inputted from the memory 252 is on, the calculator 280 calculates the Equations (28) and (29) on the basis of the detection signals 278a to 278i and the operation coefficients which are calculated by the aforementioned means, and outputs the calculation results 283 to a calculator 284. On the basis of the calculated values 283, the calculator 284 judges whether or not the nine information marks are in the information block, using the inverse Fourier transformation by the Equation (24). The judgment result 285 is demodulated by a demodulator 286 and outputted as a reproduced signal 287.

Incidentally, the lattice points 103 are arranged in the radial and circumferential directions of the optical disk in the example of the recording method shown in FIG. 16, but the periods of the lattice points on the adjoining information tracks may be shifted by a half period from each other. At this time, the crosstalk at each lattice point in the radial direction of the optical disk is smaller than that of FIG. 16. As a result, the lattice point interval can be narrowed in the radial direction of the optical disk than that of the example of the recording method of FIG. 16, so that a higher recording density in the radial direction of the optical disk can be achieved.

The description thus far made has been exemplified by two-dimensional recording, but the present invention can also be applied to one-dimensional recording. In the one-dimensional recording, a split photodetector is divided plurally in the direction of movement of the light spot but not in the radial direction of the track. The recording pattern at this time may be formed by recording the marks on the one-dimensional lattice points formed on one track.

In the foregoing description, moreover, the recording marks have been exemplified by the magnetic marks on the magnetooptical disk but may be phase-changing marks or rough pits as of a video disk or a digital audio disk. This modification does not need to be equipped with two sets of photodetectors in the signal detecting system but may be equipped with one set so that the detecting system can be simplified.

As has been described hereinbefore, an arrangement of a plurality of mutually close marks can be detected by using one spot so that the information can be densely recorded and reproduced by a simple construction.

What is claimed is:

1. An optical disk apparatus comprising:

a semiconductor laser;

an optical system for condensing light coming from said semiconductor laser onto an optical recording medium;

a photodetector for separately detecting the optical intensities of a central portion and a peripheral portion of the light reflected from said optical recording medium;

a signal processor for processing a plurality of signals obtained from said photodetector; and a reproducing circuit for reproducing the signals recorded on said recording medium, from signals received from said signal processor.

2. An optical disk apparatus according to claim 1, wherein said photodetector is split into a central portion and a peripheral portion.

3. An optical disk apparatus according to claim 1, further comprising an optical element for branching said reflected light into the central portion and the peripheral portion.

4. An optical disk apparatus, comprising:

a semiconductor laser:

an optical system for condensing light coming from said semiconductor laser onto an optical recording medium;

a polarizing prism for branching light reflected from said optical recording medium into two beams;

first and second photodetectors for receiving a respective one of said two beams and detecting the optical intensities of the respective central portions and peripheral portions of the two beams;

a first signal processor for processing a plurality of outputs obtained from said first photodetector;

second signal processor for processing a plurality of outputs obtained from said second photodetector;

a differential amplifier for outputting a signal corresponding to the difference between the outputs of said first and second signal processors; and a reproducing circuit for reproducing the signals recorded on said recording medium, from signals received from said first and second signal processors.

5. An optical disk apparatus according to claim 1, further comprising a phase filter for partially acting upon the beam incident upon said optical recording medium to change the phase thereof.

6. An optical disk apparatus according to claim 5, wherein said phase filter changes the phase of the portion of the incident light that reflects as the central portion of the reflected light from said recording medium.

7. An optical disk apparatus according to claim 1, wherein said signal processor is a differential amplifier for outputting a signal by amplifying with a predetermined gain the difference between the optical intensities of the central portion and the peripheral portion of the reflected light from said optical recording medium, detected by said photodetector.

8. An optical disk apparatus according to claim 1, wherein said photodetector is a photodetector split equivalently with a standardized split radius of 0.4 or more.

9. An optical disk apparatus comprising:

a semiconductor laser;

an optical system for condensing the light from said semiconductor laser upon a recording medium;

a photodetector for detecting light which has been diffracted by said recording medium;

means for reproducing the signal recorded on said recording medium, from an electrical signal coming from said photodetector; and a phase filter or a light-shielding sheet for acting partially upon the light beam incident upon said recording medium, wherein the reproduced signal is generated by detecting the optical intensity of only the sectionally peripheral portion of said diffracted light.

10. An optical information reproducing method for optically reproducing information recorded on a recording medium by irradiating said recording medium with a laser beam and by detecting the light returning from said recording medium, wherein:

when the diffracted light returning from said recording medium is detected, the optical intensity distribution of said diffracted light is detected by a plurality of detectors to generate a plurality of signals;

said plurality of signals are calculated to generate a reproduced signal for detecting said information;

the optical intensities of the central and peripheral portions of said diffracted light are detected separately to generate first and second signals having different gains; and the difference between said first and second signals is taken to produce the reproduced signal for detecting said information.

11. An optical information reproducing method according to claim 10, wherein said central portion and said peripheral portion are separately detected with a boundary having a standardized split diameter of 0.4 or more.

12. An optical information reproducing method according to claim 10, further comprising means for controlling the phase of the light beam for illuminating said optical recording medium.

13. An optical information reproducing method for optically reproducing information recorded on a recording medium by irradiating said recording medium with a laser beam and by detecting the light returning from said recording medium, wherein:

when the diffracted light returning from said recording medium is detected, the optical intensity distribution of said diffracted light is detected by a plurality of detectors to generate a plurality of signals;

said plurality of signals are calculated to generate a reproduced signal for detecting said information;

the diffracted light returning from said recording medium is halved, the halves being individually detected by photodetectors split into a plurality of areas and having identical respective shapes;

the difference between the outputs of corresponding areas of identical shape of said photodetector are individually taken; and said plurality of differential signals are calculated to generate the reproduced signal for detecting said information.

14. An optical information recording/reproducing method for detecting a recording mark recorded on a recording medium to reproduce information by scanning the recording mark with a light spot, wherein the light spot is sized to irradiate a plurality of recording marks simultaneously, and the spatial distribution of the diffracted light intensity by the irradiated recording mark is detected to detect the recording mark from the spatial distribution of the diffracted light intensity detected.

15. An optical information recording/reproducing method according to claim 14, wherein the information is recorded in the form of presence or absence of the recording mark at a lattice point.

16. An optical information recording/reproducing method according to claim 15, wherein a learning mark recorded at the lattice point defined on the recording medium is reproduced, the coefficient of an arithmetic equation for calculating the presence or absence of the recording mark on the lattice point from the spatial distribution of the diffracted light intensity is calculated from the reproduced signal, the calculated coefficient is stored, and a calculation is executed for reproducing the signal on the basis of the stored coefficient.

17. An optical information recording/reproducing apparatus for detecting a recording mark recorded at a predetermined lattice point on a recording medium, by scanning the recording medium with a light spot and by detecting the reproduced light by a photodetector, comprising:

a plurality of photodetectors;

calculation means; and calculation coefficient storage means, wherein the light spot is sized to irradiate a plurality of lattice points simultaneously, and whether or not the recording mark is at the lattice point is judged by said calculation means calculating the detection signals of the plurality of photodetectors reflecting the spatial distribution of the reproduced optical intensity, using a coefficient stored in said calculation coefficient storage means, by said calculation means.

18. An optical information recording/reproducing apparatus according to claim 17, further comprising means for updating the calculation coefficient stored in said calculation coefficient storage means, by reproducing a group of recording marks which are recorded at known lattice points on the recording medium.

* * * * *

UNITED STATES PATENT AND TRADEMARK OFFICE
CERTIFICATE OF CORRECTION

PATENT NO.   : 5,774,444
DATED        : June 30, 1998
INVENTOR(S)  : T. SHIMANO et al It is certified that error appears in the above-indentified patent and that said Letters Patent is hereby corrected as shown below: On the title page, item [63]:

Change the Related U.S. Application Data to read:

Continuation-in-part of PCT/JP/00542 filed Mar. 24, 1995, which is a Continuation-in-part of Ser. No. 321,619, Oct. 12, 1994, Pat. No. 5,703,846 and Ser. No. 285,003, Aug. 2, 1994, Pat. No. 5,491,678, which is a Continuation of Ser. No. 704,227, May 22, 1991, abandoned.

Signed and Sealed this

Sixth Day of October, 1998

*Attest:*

BRUCE LEHMAN

*Attesting Officer*     Commissioner of Patents and Trademarks